US009195890B2

(12) United States Patent
Bergen

(10) Patent No.: US 9,195,890 B2
(45) Date of Patent: Nov. 24, 2015

(54) IRIS BIOMETRIC MATCHING SYSTEM

(71) Applicant: SRI International, Menlo Park, NJ (US)

(72) Inventor: James R. Bergen, Hopewell, NJ (US)

(73) Assignee: SRI INTERNATIONAL, Menlo Park, CA (US)

(*) Notice: Subject to any disclaimer, the term of this patent is extended or adjusted under 35 U.S.C. 154(b) by 0 days.

(21) Appl. No.: 14/100,615

(22) Filed: Dec. 9, 2013

(65) Prior Publication Data
US 2014/0161325 A1 Jun. 12, 2014

Related U.S. Application Data

(60) Provisional application No. 61/735,495, filed on Dec. 10, 2012, provisional application No. 61/837,202, filed on Jun. 20, 2013.

(51) Int. Cl.
G06K 9/00 (2006.01)
A61B 3/14 (2006.01)

(52) U.S. Cl.
CPC .......... *G06K 9/00617* (2013.01); *G06K 9/0061* (2013.01)

(58) Field of Classification Search
CPC ..................................................... G06K 9/00
USPC .................................. 382/115–118; 351/206
See application file for complete search history.

(56) References Cited

U.S. PATENT DOCUMENTS

| 5,291,560 | A * | 3/1994 | Daugman | ............ A61B 3/1216 351/206 |
| 8,050,463 | B2 * | 11/2011 | Hamza | .......................... 382/115 |
| 8,317,325 | B2 * | 11/2012 | Raguin et al. | ................. 351/206 |
| 8,603,165 | B2 * | 12/2013 | Park | ............................ 623/6.23 |
| 2011/0142297 | A1 | 6/2011 | Yu et al. | |

FOREIGN PATENT DOCUMENTS

KR  10-2003-0066512 A  8/2003

OTHER PUBLICATIONS

Swiniarski, "Experiments on Human Recognition Using Error Backpropagation Artificial Neural Network", Neural networks class (CS553) of San Diego State University Computer Science Department, Apr. 2004.
Annapoorani et al., "Accurate and Fast Iris Segmentation", International Journal of Engineering Science and Technology, vol. 2, Issue 6, pp. 1492-1499, 2010.
International Search Report and Written Opinion mailed Mar. 20, 2014 for Application No. PCT/US2013/073887, 13 pages.

* cited by examiner

*Primary Examiner* — Abolfazl Tabatabai
(74) *Attorney, Agent, or Firm* — Barnes & Thornburg LLP; Thomas J. McWilliams; Edward F. Behm, Jr.

(57) ABSTRACT

A method and apparatus for biometric iris matching comprising pre-processing an input image capturing one or more eyes to produce one or more rectified iris images, coding the one or more rectified iris images into one or more multiresolution iris codes and matching the one or more multiresolution iris code with a set of stored multiresolution iris codes to determine whether a match exists.

22 Claims, 18 Drawing Sheets

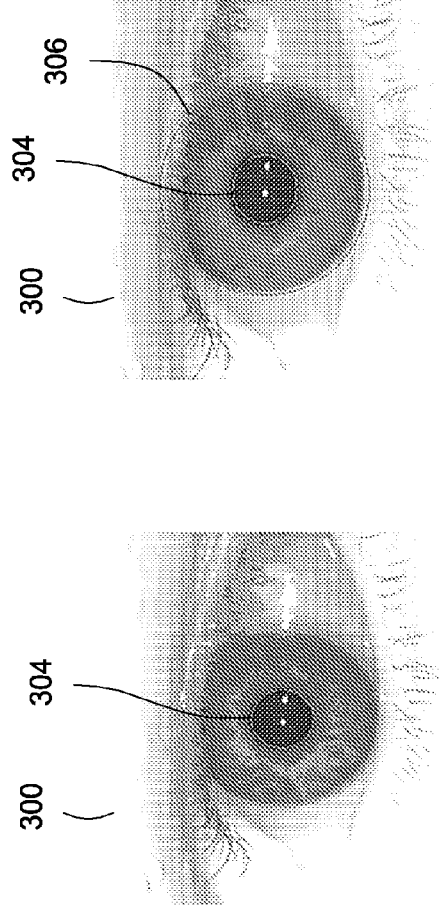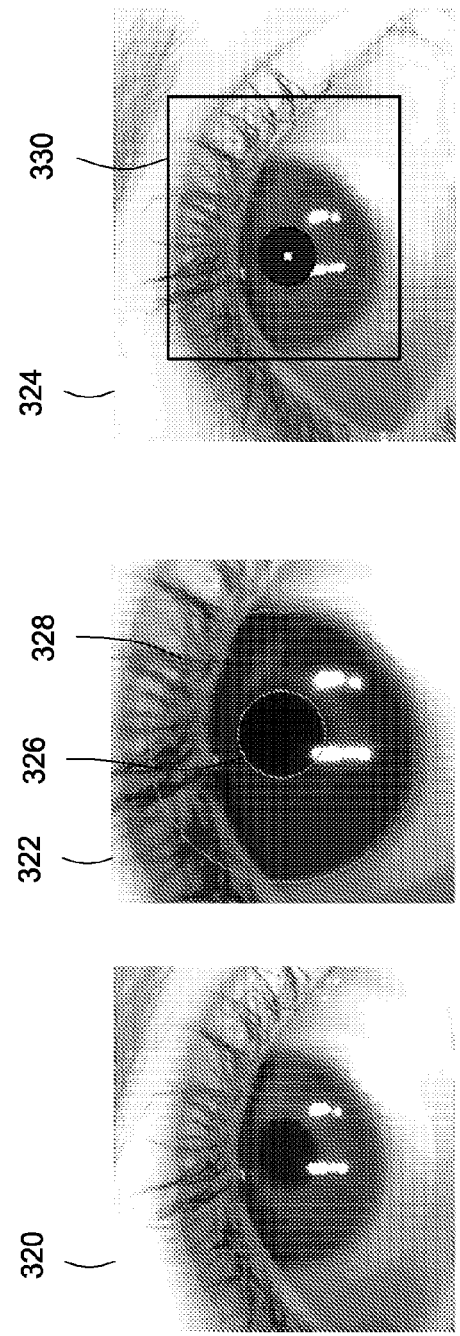
FIG. 3B
FIG. 3C

IRIS BIOMETRIC MATCHING SYSTEM

CROSS-REFERENCE TO RELATED APPLICATIONS

This application claims the benefit of U.S. Provisional Patent Application No. 61/735,495 filed Dec. 10, 2012 and U.S. Provisional Patent Application No. 61/837,202 filed Jun. 20, 2013, the disclosures of which are herein incorporated by reference in their entirety.

GOVERNMENT RIGHTS

This invention was made in part with govenment support under Army Research, Development & Engineering contract No. W911NF-11-C-0255. The Government has certain rights in this invention.

BACKGROUND OF THE INVENTION

1. Field of the Invention

Embodiments of the present invention generally relate to iris matching and, more particularly, to a method and apparatus for performing iris preprocessing, coding and biometric matching.

2. Description of the Related Art

Current iris recognition-based biometric devices impose strict requirements on the image capture process in order to meet the needs of iris biometric analysis. No methods exist to make use of iris biometric information that does not meet these strict requirements. For example, images captured of downward cast eyes, eyes at oblique angles to a capturing device, or in differing light conditions often cannot be matched by current iris matching systems. Current iris biometric applications therefore must tailor image capture to existing processing.

Therefore there is a need for a biometric iris matching system that processes a wide range of available iris data to achieve accurate biometric results.

SUMMARY OF THE INVENTION

An apparatus or method is provided for biometric iris matching substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3B depicts an illustration of a result of the preprocessor in FIG. 2 in accordance with exemplary embodiments of the present invention;

FIG. 3C depicts an illustration of a another result of the preprocessor in FIG. 2 with an alternate image in accordance with exemplary embodiments of the present invention;

DETAILED DESCRIPTION

Embodiments of the present invention generally relate to a method and apparatus for biometric iris matching. According to one embodiment, a method for biometric iris matching comprises receiving an infrared image of an eye, segmenting the iris and pupil boundaries in the eye, correcting for any tilting or obliquity of the iris and/or pupil as well as correcting for corneal distortion, generating a multiresolution iris code based on the corrected iris image, and matching the iris code against a known database of iris images to determine whether a match exists.

Figure 1:
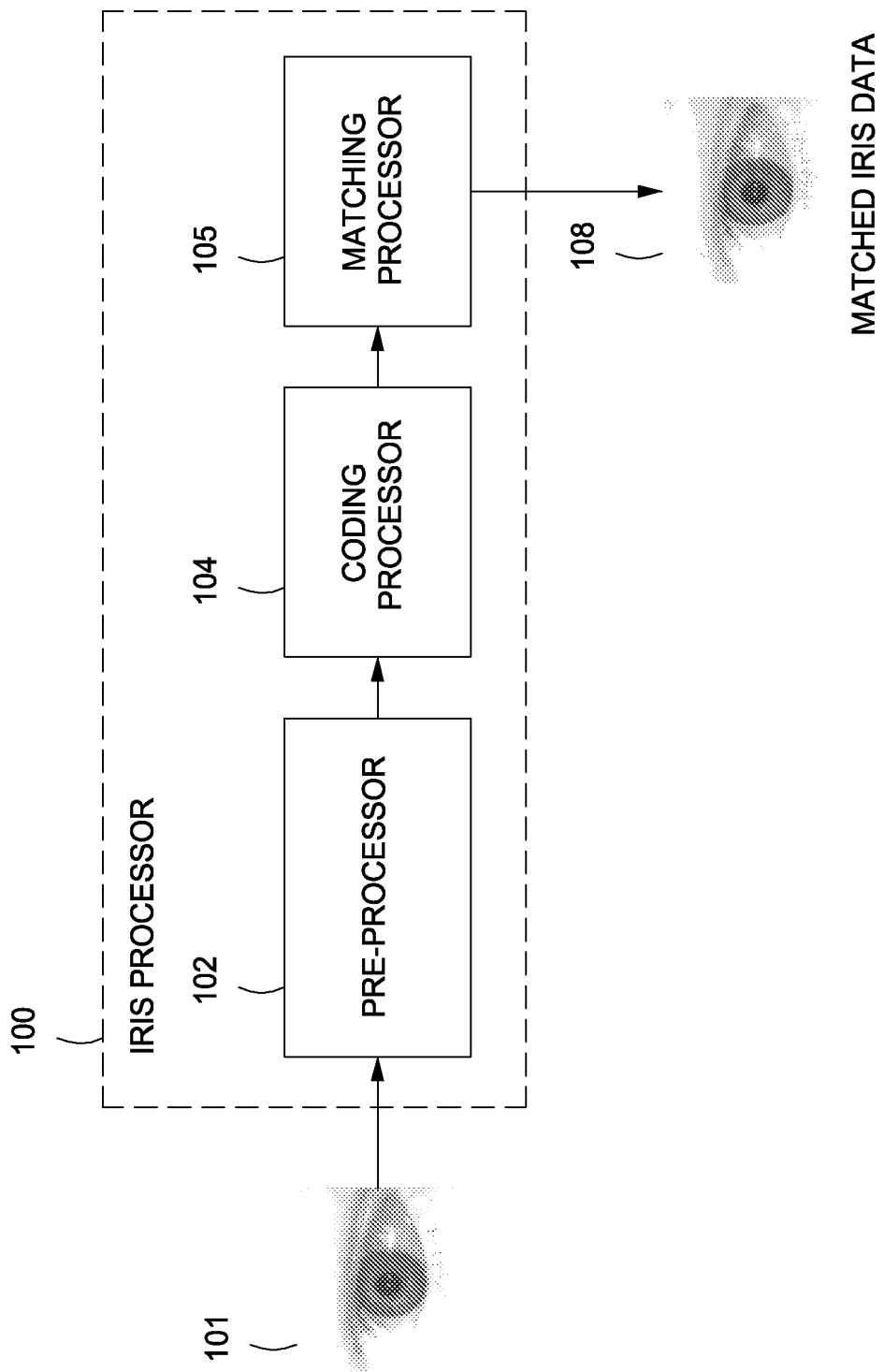
FIG. 1 depicts a block diagram of an iris processor for biometric iris matching in accordance with exemplary embodiments of the present invention.

FIG. 1 depicts a block diagram of an iris processor 100 for biometric iris matching in accordance with exemplary embodiments of the present invention. The iris processor 100 comprises a pre-processor 102, a coding processor 104 and a matching processor 106. The iris processor 100 receives images as input, for example, input image 101 and outputs a matched iris 108 from a remote or local database. Those of ordinary skill in the art would recognize that the database may be accessed as a "cloud" service, directly through an internet connection, or the like. The pre-processor 102, the coding processor 104 and the matching processor 106 may execute on a single device, or on different devices, servers, cloud services or the like, as indicated by the dashed outline of the iris processor 100. The iris processor 100 may be modular and each processor may be implemented on a single device, multiple devices, in the cloud as a service as one of ordinary skill in the art would recognize. Those of ordinary skill in the art will recognize that the pre-processor 102 may be used independently of the coding processor 104 and the matching processor 106.

According to exemplary embodiments of the present invention, the input image 101 is an infrared image, and is captured by an infrared capture device (not shown), coupled to the iris processor 100. The infrared capture device may be any type of infrared capture device known to those of ordinary skill in the art. In other instances, the input image 101 is a red, green, blue (RGB) image, or the like. The input image 101 contains an eye with an at least partially visible iris and pupil and the iris processor 100 attempts to match that eye with an iris of an eye image in a local or remote database of eye images. According to exemplary embodiments, irises are matched based on Hamming distances between two coded iris images.

Initially, the input image 101 is processed by the pre-processor 102. The pre-processor 102 segments and normalizes the iris in the input image 101, where input image 101 may have variable iris/pupil and iris/sclera contrast, small eyelid openings, and non-frontal iris presentations. The result of the pre-processor 102 is a modified iris image with clearly delineated iris boundaries and synthesized quasi-frontal presentation. For example, if the iris in the input image 101 is rotated towards the left, right, up or down, the pre-processor 102 will synthesize an iris on the input image 101 as if it was positioned directly frontally. Similarly, a frontally positioned pupil will be synthesized on the skewed or rotated pupil of the input image 101.

The coding processor 104 analyzes and encodes iris information from the iris image generated by the pre-processor 102 at a range of spatial scales so that structural iris information contained in the input image 101 of varying resolution, quality, and state of focus can be robustly represented. The information content of the resulting code will vary depending on the characteristics of input image 101. The code generated by the coding processor 104 representing the input image 101 allows spatial interpolation to facilitate iris code alignment by the matching processor 106.

The output code from the coding processor 104 is coupled to the matching processor 106. The matching processor 106 incorporates constrained active alignment of iris structure information between stored iris images and captured iris codes generated from the input image 101 to compensate for limitations in iris image normalization by the pre-processor 102. The matching processor 106 performs alignment by performing local shifting or warping of the code to match the generated code with a stored iris code template based on estimated residual distortion of the code generated by the coding processor 104. According to some embodiments, a "barrel shift" algorithm is employed to perform the alignment. Accordingly, structural correspondences are registered and the matching processor 106 compares the aligned codes to determine whether a match exists. If a match is found, the matching processor returns matched iris data 108.

The matched iris data 108 may be used in many instances, for example, to authorize financial transactions. The pre-processor 102 may be an application executing on a mobile device, such as a mobile phone, camera, tablet, or the like. The pre-processor 102 on the mobile device may capture an image of a user's eye using the camera of the device, perform the pre-processing steps on the mobile device, and then transmit a bundled and encrypted request to the coding processor 104, which may be accessed via a cloud service on a remote server of, for example, a financial institution. In other embodiments, the application on the mobile device may also comprise the coding processor 104 and the iris coding is performed on the mobile device. In some embodiments, the pre-processor 102 may be used in conjunction with an automated teller machine (ATM), where a user is authorized via their iris being scanned and processed by the pre-processor 102. The pre-processor 102 may then reside in the software of the ATM, or the ATM may supply the image captured by the camera to a server where the pre-processor 102 is executed for pre-processing.

The coding processor 104 produces an iris code that is transmitted to the matching processor 106. The matching processor 106 may be hosted on a server of a financial institution, or be a remote third party service available to multiple financial institutions for authenticating the user based on their iris image. Once a user is authenticated, financial transactions may be carried out between the user and the financial institutions. Similarly, the iris processor 100 may be used to authenticate a user in any context, such as signing in to a social network, a messaging service or the like.

The iris processor 100 may be used, for example, for collecting and targeting of marketing data based upon iris identification. For example, a customer in a grocery store can be detected and their iris can be stored in a local or remote database. If the customer enters the grocery store again, or an associated store with which the iris information is shared, the store can build a profile of the customer, the items they most often purchase, peruse, or the like by using iris detection and gaze tracking. These marketing profiles can be used by the store itself for product placement, or may be used by third party marketing services as marketing data. In other embodiments, the customer profile can be matched with identifying information, and when the customer uses a website affiliated with the store, or a website which has access to the iris data, the website identifies the customer and offers targeted marketing to the customer.

The iris processor 100 may be used to authorize a cellular device user, determining whether the device is stolen or not, in conjunction with geo-location data, or the like. In this embodiment, upon purchase of a cellular device, the user may "imprint" their identity on the device based on their iris information so that others can be prevented from using the device if reported stolen. Authorization can also be extended to the office or personal environments, where the iris processor 100 may be used to determine whether an authorized or detected user has access to a particular location. For example, in a secure office environment, taking photographs may be prohibited for the majority of employees, but overriding this prohibition and enabling the camera is available to authorized employees. The employee's mobile device will be used to capture an image of the employee, and the iris processor 100 will match the iris of the employee to extract an employee profile which delineates the authorizations for this employee.

In the medical field, the iris processor 100 may be used to determine whether a person accessing particular medical resources, such as medicine, devices, or the like, are permitted to access these resources. The iris processor 100 can be coupled with a recording device which captures video of those accessing a medicine cabinet, for example, and whether they are authorized to take medical resources from the cabinet.

The iris processor 100 may be used as a security system and authentication device by a small company with limited resources. By simply coupling a camera or other image capturing device to an electro/mechanical locking system, the company can limit access to doors, offices, vaults, or the like, to only authorized persons. The iris codes produced by the coding processor 104 can be used to authorize, for example, airline boarding passes. On purchase of a travel (airline, train, bus, etc.) ticket, the coding processor 104 generates an iris code of the purchaser and saves the iris code for imprinting on the boarding pass. When a traveler is boarding an airplane, bus or train, the carrier may invoke the matching processor 106 to match the iris code on the boarding pass with the iris code produced by the traveler presenting the boarding pass. If there is a match, the traveler is allowed to board the bus, train or airplane.

Figure 2:
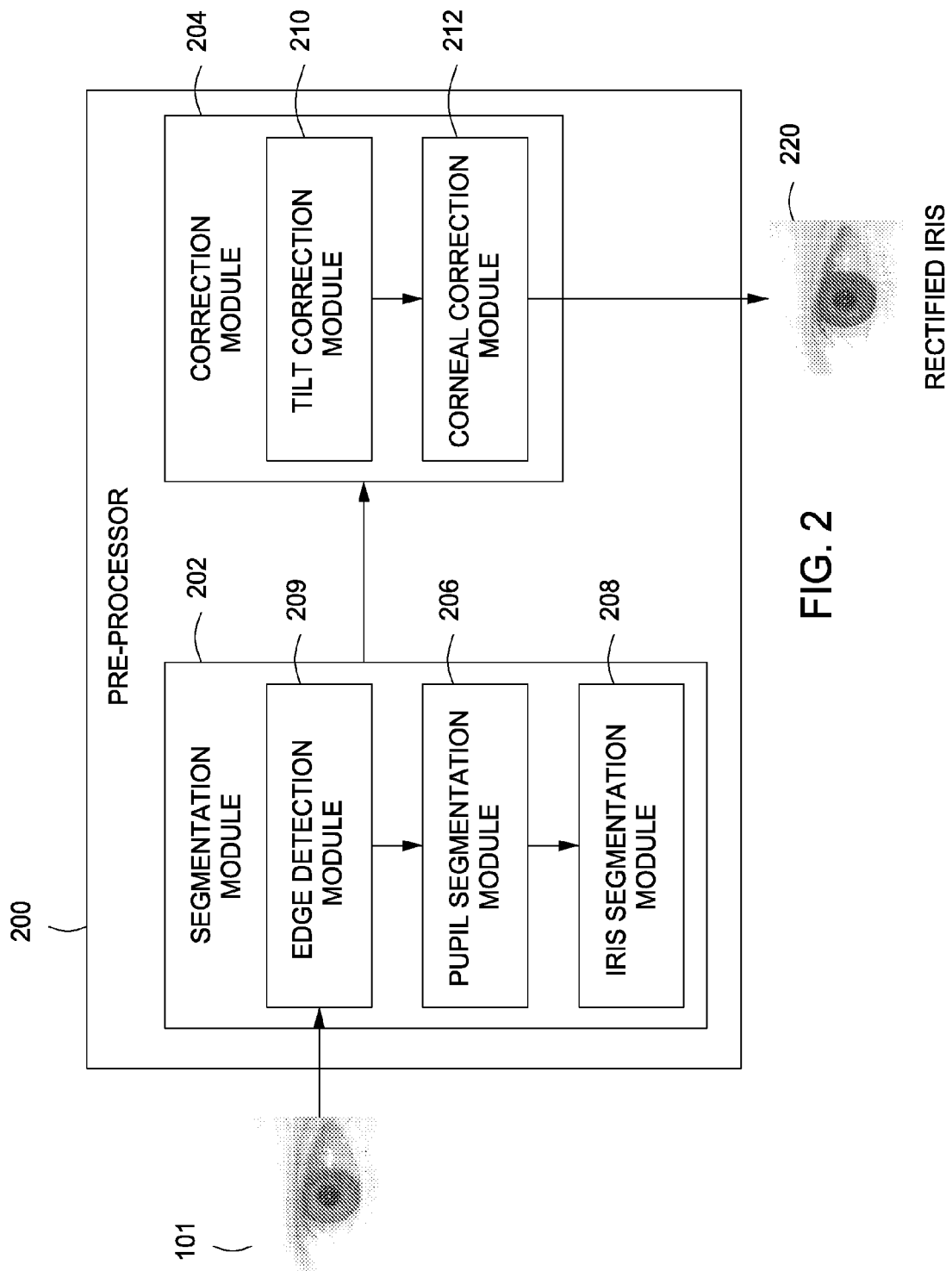
FIG. 2 depicts a block diagram of the pre-processor of the iris processor of FIG. 1 in accordance with exemplary embodiments of the present invention.

FIG. 2 depicts a block diagram of the pre-processor of the iris processor in accordance with exemplary embodiments of the present invention. The pre-processor receives the input image 101 and outputs a rectified iris image 220. The rectified iris image 220 corrects for uncontrolled capture scenarios such as ambient illumination conditions, varied illumination geometries, reduced eyelid opening area, presentation angle (obliquity), or the like. Those of ordinary skill in the art will recognize that the rectified iris image 220 corrects for various nonconformities based on the matching algorithm the iris image 220 will be provided to.

The pre-processor 200 comprises a segmentation module 202 and a correction module 204. The segmentation module 202 further comprises a pupil segmentation module 206, an iris segmentation module 208 and an edge detection module 209. The segmentation module 202 corrects an input image for low-contrast pupil and iris boundaries. The image produced by the segmentation module 202 is then coupled to the correction module 204 for further correction. The correction module 204 comprises a tilt correction module 210 and a corneal correction module 212. The details of the segmentation module 202 are described below.

Figure 3A:
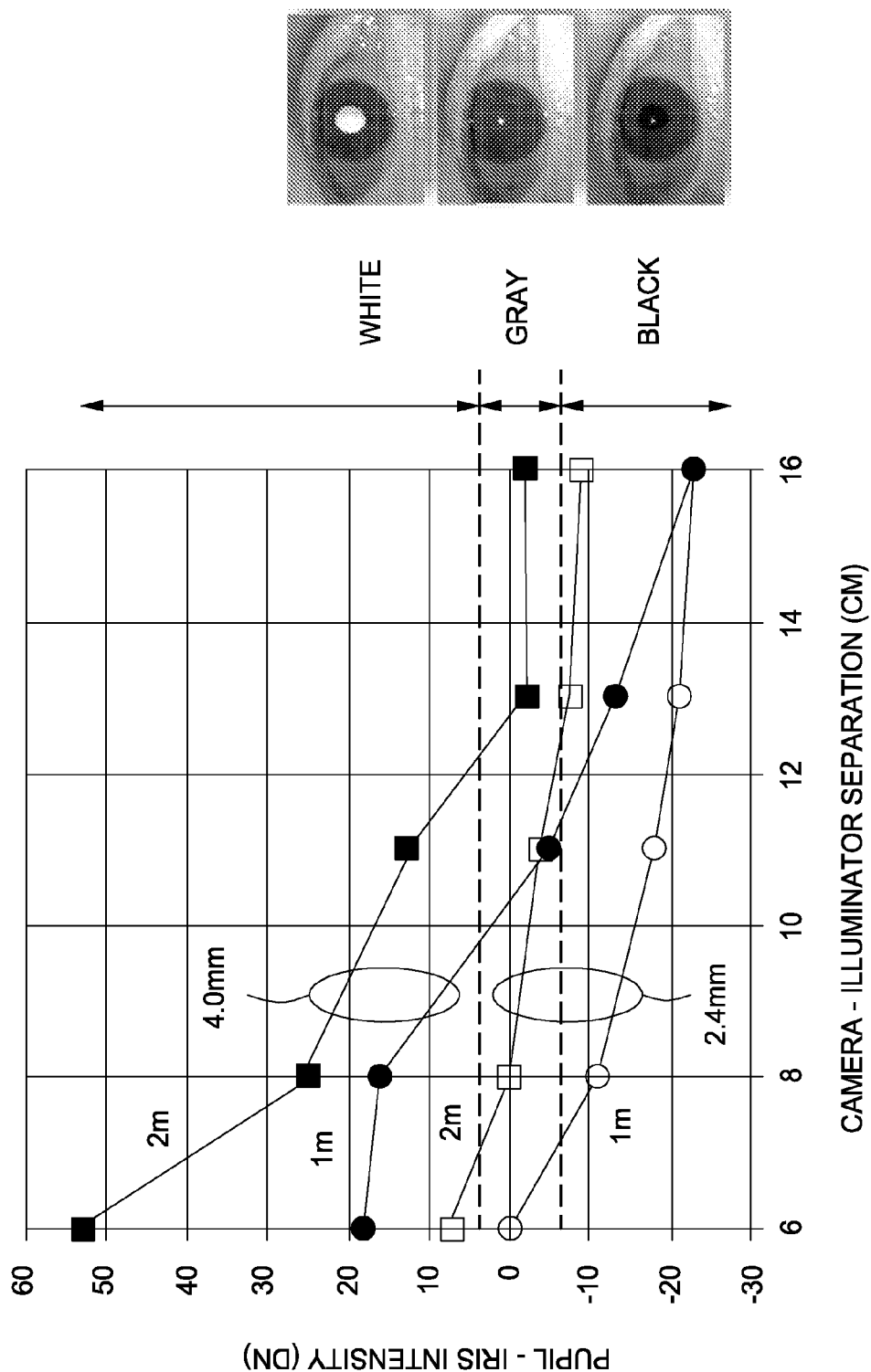
FIG. 3A depicts a graphical plot of the effect of camera illumination on pupil and iris intensity in accordance with exemplary embodiments of the present invention.

FIG. 3A illustrates that varying illumination geometry produces varying pupil appearance. FIG. 3A illustrates measurement of pupil-iris intensity difference as a function of distance, e.g., 1 and 2 meters, pupil size, e.g., 2.4 mm and 4.0 mm, and camera/illuminator distance, e.g., 6 to 16 cm. As the camera/illuminator distance increases, the pupil iris intensity decreases. The contrast of the pupil varies greatly as a function of distance between camera and subject as well as functions of illuminator geometry and pupil diameter. The variation with distance is due to the fact that the angular distance between the illuminator and camera axes are greater at short range (e.g., 1 m) than at longer distances. As the illuminator and camera axes get closer, more light that is reflected from the retina back out through the pupil is captured by the camera lens. This causes red eye in ordinary photographs and bright pupils in infrared photography. An exemplary illuminator is further described in U.S. Pat. No. 7,542,628 to Matey entitled "Method and Apparatus for Providing Strobed Image Capture" filed on Jan. 19, 2006 and U.S. Pat. No. 7,657,127 to Matey entitled "Method and Apparatus for Providing Strobed Image Capture" filed on Apr. 24, 2009, herein incorporated by reference in its entirety.

The segmentation module 202 and the correction module 204 may be used, for example, in the medical field, in targeted marketing, customer tracking in a store, or the like. For example, pupil and iris insertion may be performed by the pre-processor 102, as described further with respect to FIGS. 2 and 3A-3D, in the medical field as a diagnostic tool for diagnosing diseases that a person might have based on their iris profiles.

Figure 3D:
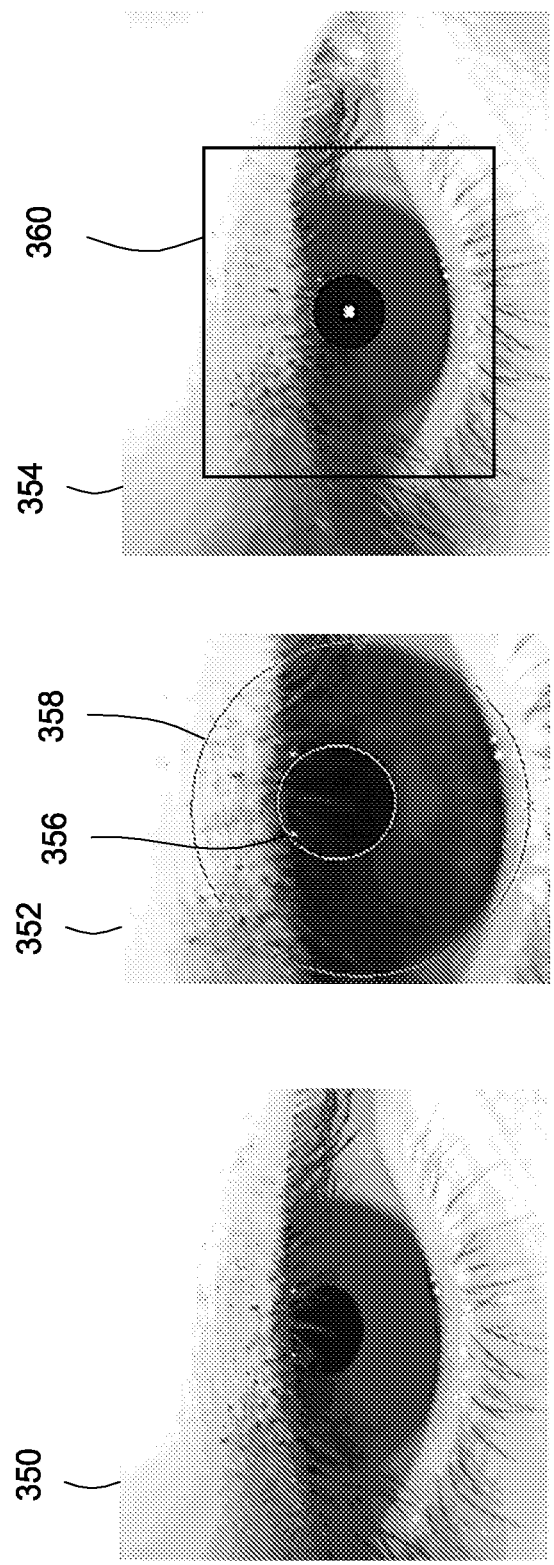
FIG. 3D depicts an illustration of yet another result of the preprocessor in FIG. 2 with yet an alternate image in accordance with exemplary embodiments of the present invention.

FIG. 3B illustrates an example of iris and pupil boundary matching in accordance with exemplary embodiments of the present invention. According to some embodiments, iris diameters are normalized by the iris segmentation module 208. Size normalization is performed using a range estimate derived from an autofocus setting of the camera taking the image. The image 300 shows the pupil boundary 304 calculated by the pupil segmentation module 206. The pupil segmentation module 206 then inserts an artificial dark pupil in the pupil boundary 304 in image 300. Image 300 is then coupled to the iris segmentation module 208, which calculates the iris boundary. FIGS. 3C and 3D illustrate examples of inserted artificial pupils and iris boundaries. In FIG. 3C, input image 320 is coupled to the pre-processor 200. The input image 320 is then segmented by pupil segmentation module 206 to calculate a pupil boundary region 326. The pupil segmentation module then inserts an artificial black colored pupil in the pupil boundary region 326. Additionally, oblique irises and pupils are warped to be circular. The insertion of an artificial pupil in the pupil boundary region 326 may be used, for example, to remove red-eye effects in an image captured by a camera. The segmentation module 202 can be used to segment the pupil and iris areas, and the pupils may be red-eye corrected by insertion of the artificial pupil. This process of segmentation and warping is described in more detail below.

FIG. 3D shows a similar process but on a downward facing iris in image 350. The pupil boundary 356 is still detected despite being occluded by the eyelid in image 352. The pupil and iris are both warped to form circular regions to aid in segmentation. The pupil segmentation module 206 inserts a black disk/artificial pupil in the image 352 and couples the image 352 to the iris segmentation module 208. The iris segmentation module 208 determines an iris boundary 358. Ultimately, the iris and pupil boundaries are corrected for various lighting conditions and presented in image 354, where region 360 can be seen with the artificial pupil. According to some embodiments, the artificial pupil need not be necessarily black and may be another suitable color, based on compatibility with third party iris recognition software.

The pupil boundaries, for example, 304, 326 and 356 and the iris boundaries (iris/sclera boundary areas), for example, 306, 328 and 358 are calculated using a Hough transform, according to one embodiment. The pupil segmentation module 206 and the iris segmentation module 208 employ edge detection using the edge detection module 209 to generate edge maps which works for varying scales of grayscale pupils, even in instances with low edge contrast. Once the pupil segmentation module 206 determines the segmented pupil area (and therefore, the pupil contour) and the pupil and iris have been warped to form circular regions, the segmented pupil area is replaced with a black or dark disk to simulate the appearance of a dark pupil.

Figure 4A:
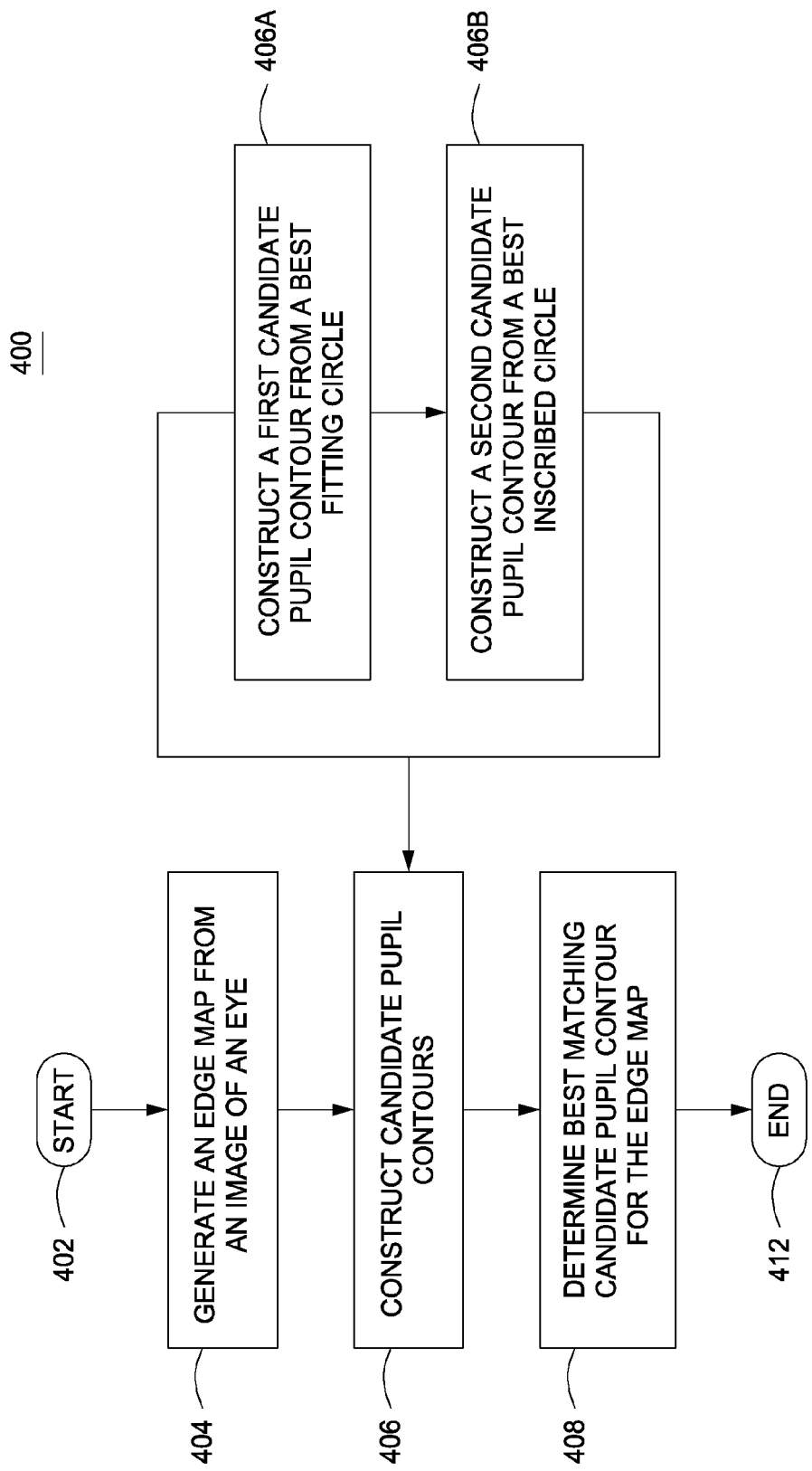
FIG. 4A depicts a flow diagram for a method for edge detection in accordance with one embodiment of the present invention.

FIG. 4A depicts a flow diagram for a method 400 for edge detection in accordance with one embodiment of the present invention. The method 400 is an exemplary illustration of the operation of the edge detection module 209 used to detect pupil and iris boundaries.

Figure 4B:
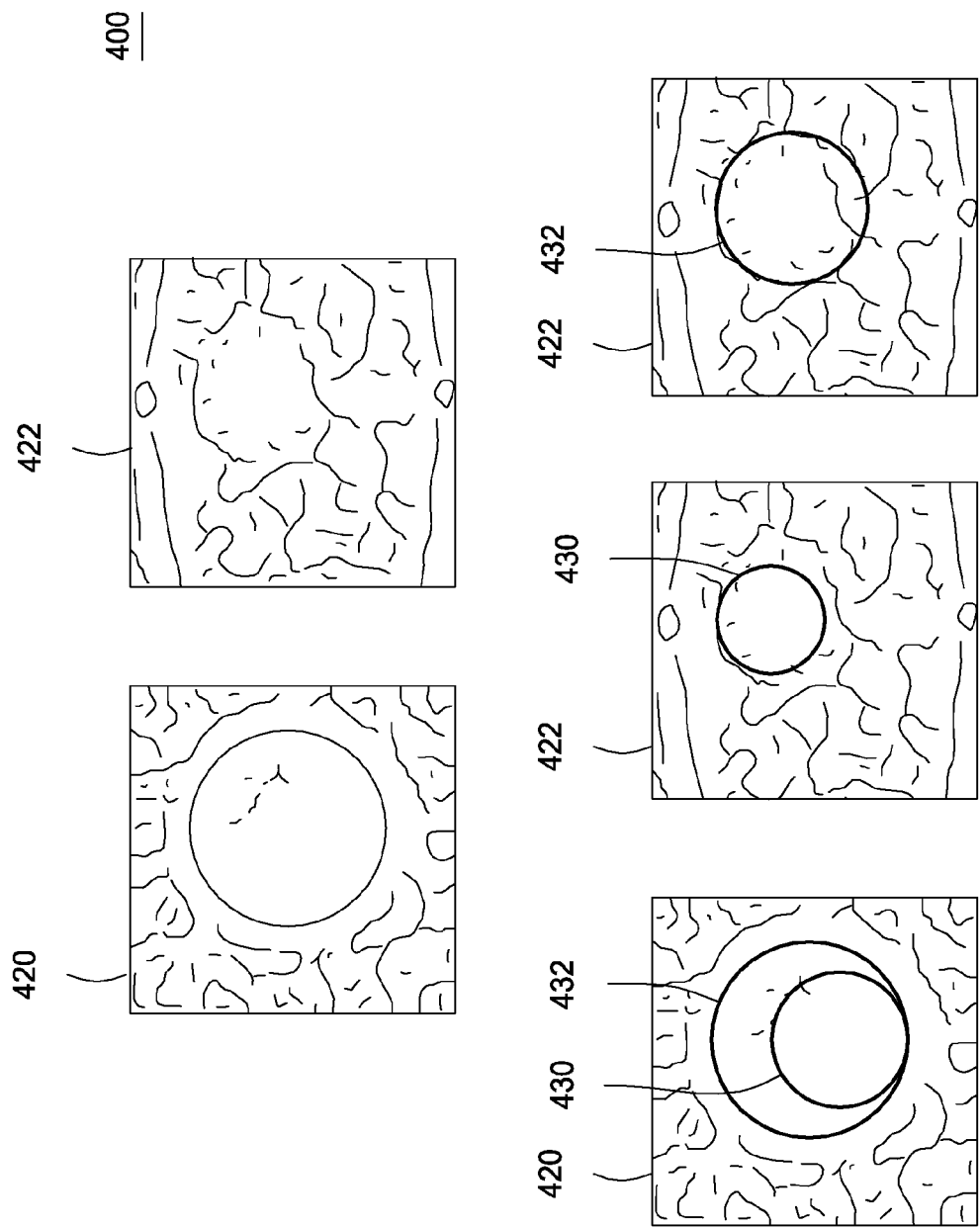
FIG. 4B shows candidate pupil contour curves in accordance with exemplary embodiments of the present invention.

The method begins at step 402 and proceeds to step 404. At step 404, an edge map is generated from an image of an eye, for example, input image 101. An exemplary edge map for an iris image which was brightly illuminated is shown in FIG. 4B, image 420. Image 422 is an edge map for an iris image which was not as brightly illuminated, i.e., an indistinct pupil whose edges are not as clearly visible as those in image 420.

At step 406, candidate pupil contours are constructed for the given edge map. Step 406 consists of sub-steps 406A and 406B. At sub-step 406A, a first candidate pupil contour is created from a best fitting circle, as shown in FIG. 4B, image 420. For example, a Hough transform or RANSAC (random sample consensus) method can be used to find the circle that has the greatest level of support in the edge map in the sense that the largest fraction of circle points for that circle coincide with edge points. At step 406B, a second candidate pupil contour is constructed from a best inscribed circle as shown in FIG. 4B, image 422. Those of ordinary skill in the art would recognize that an inscribed circle is a circle that can be drawn in an area/region of the edge map so that no edge points (or no more than a specified small number of edge points) lie within the circle. According to one embodiment, the best inscribed circle is the largest such inscribed circle that can be found in the area/region of the pupil. Then method then proceeds to step 408, where the method 400 determines the best matching candidate pupil contour from the first and second candidate pupil matching contours for the edge map. According to one embodiment, the best match is determined by assessing a level of support for the best fitting circle and selecting the best fitting circle as the best match if this level of support is above a threshold value. The best inscribed circle is selected as the best match if the level of support for the best fitting circle is below a threshold value.

According to one embodiment, an automatic process based on how well the best fit contour (circle) matches the edge contour in the edge contour map is used to decide which candidate contour to choose. For example, for the best supported circle described above, a subset of edge points can be selected that is limited to those edge points whose angular orientation is consistent with that edge point being a part of the candidate circle. In other words only edge points whose direction is approximately perpendicular to the direction from the estimated center of the candidate circle are included. This process eliminates from consideration those edge points that may accidentally fall at the correct position to be part of the circle but that do not correspond to the actual circle contour. If the proportion of such selected edge points is greater than some specified fraction (e.g. 20%) of the number of points comprising the circle then the level of support for that circle is deemed to be sufficient and the best fitting circle is selected. If the level of support by the selected edge points is less than this threshold then the best fitting circle is deemed to have insufficient support and the best inscribed circle is selected instead. Generally speaking, the best fit candidate contour will provide accurate pupil segmentation in the bright pupil image, as shown in FIG. 4B, image 420, where the bright colored eye edge map is overlayed with the best-inscribed circle 430 and the best fitting circle 432. The method then terminates at step 412 when a best matching candidate pupil contour is found.

In some instances, iris images may be captured over a range of oblique viewing conditions, for example, where gaze deviation with nasal gaze angles ranges from 0 to 40 degrees, as shown in FIG. 3D. The tilt correction module 210 rectifies the images for this tilt and generates a tilt corrected image. According to one embodiment, a tilt-corrected image may be generated by estimating or determining the magnitude and direction/angle of tilt, and then applying a geometric transformation to the iris image to compensate for the oblique viewing angle. In the case where the iris is a flat disk, the simplest form of this transformation is a stretching of the image in the direction of the tilt to compensate for the foreshortening caused by the angle between the iris and the image plane. Such a non-isotropic stretching is mathematically represented as an affine transformation. A more accurate version of this geometric de-tilting replaces the affine transformation with a projective transformation which better represents the image representation of a pattern on a flat, tilted surface.

The correction module 204 has several uses independent of the other components of the iris processor 100. For example, the correction module 204 may be used to detect a person's gaze, or to track a person's gaze continuously by capturing one or more frames of a person's eyes. The tilt correction module 210 may, for example, be used to continuously track a user's gaze on a mobile device and scroll a document, perform a swipe or the like. This tilt detection can be used, for example, independently of the matching processor 106 described in FIG. 1 to enable or disable the display of a mobile device.

In some embodiments, the correction module 204 corrects the input image 101 prior to the segmentation module establishing artificial pupil discs on the input image 101. In some instances, tilt correction may still show distortions such as the apparent eccentric pupil compression of the nasal portion of the iris, causing difficulty in biometrically matching the iris with a stored iris image. The distortion is caused by the optical effect of the cornea and anterior chamber of the human eye through which the iris is imaged. These two structures have similar refractive indexes (1.336 for the aqueous humor that fills the anterior chamber and 1.376 for the cornea) so that together their optical effect is approximately that of a single water-filled plano-convex lens in contact with the iris. Viewed from an oblique angle such a lens will produce asymmetric distortion in the iris image, compressing the image in some areas and expanding it in others.

The tilt corrected image generated by the tilt correction module 210 is coupled to the corneal correction module 212, which corrects for the above described corneal distortion.

Figure 4C:
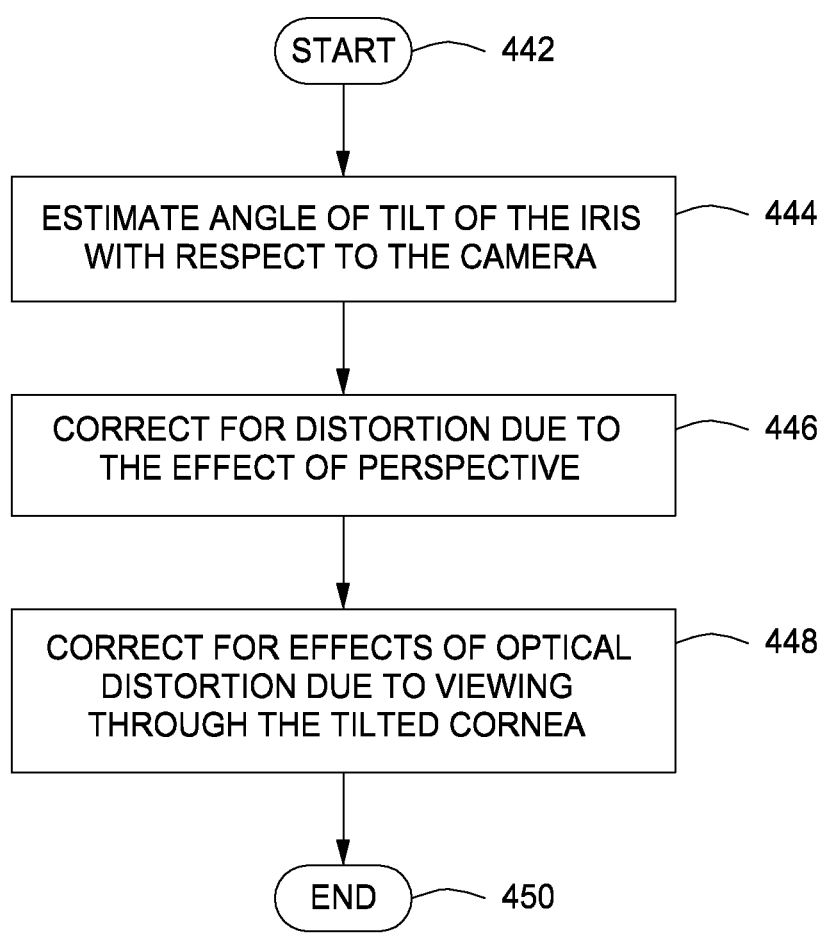
FIG. 4C depicts a flow diagram for a method for corneal distortion correction in accordance with exemplary embodiments of the present invention.

FIG. 4C depicts a flow diagram for a method 440 for corneal distortion correction in accordance with exemplary embodiments of the present invention. The method 400 is an exemplary illustration of the operation of the edge detection module 209.

The method begins at step 402 and proceeds to step 404. At step 404, the tilt correction module 210 estimates the angle of tilt of the iris with respect to the camera orientation. The tilt can be estimated roughly by finding the pupil center and measuring the distance between that center and the bright reflection in the cornea caused by the near infra-red illuminator used in iris imaging. Other methods of tilt estimation known to those of ordinary skill in the art may also be used. Indeed, any method of tilt estimation may be substituted herein.

The method proceeds to step 406, where the image is corrected for the perspective distortion, i.e., the foreshortening of the iris that occurs. The effect of foreshortening can be approximated as a simple compression of the captured image in the direction or tilt. This effect can therefore be compensated for by simply stretching the image in the direction derived from the tilt estimation step. A more accurate correction can also be performed by using a projective transformation to more precisely capture the foreshortening effect.

Finally, at step 448, the method 400 corrects for effects of optical distortion due to viewing through the tilted cornea. According to one embodiment, approximate correction for the optical distortion discussed above can be achieved by measuring and correcting the effects of pupil eccentricity and pupil elongation. The method terminates at step 450.

Figure 4D:
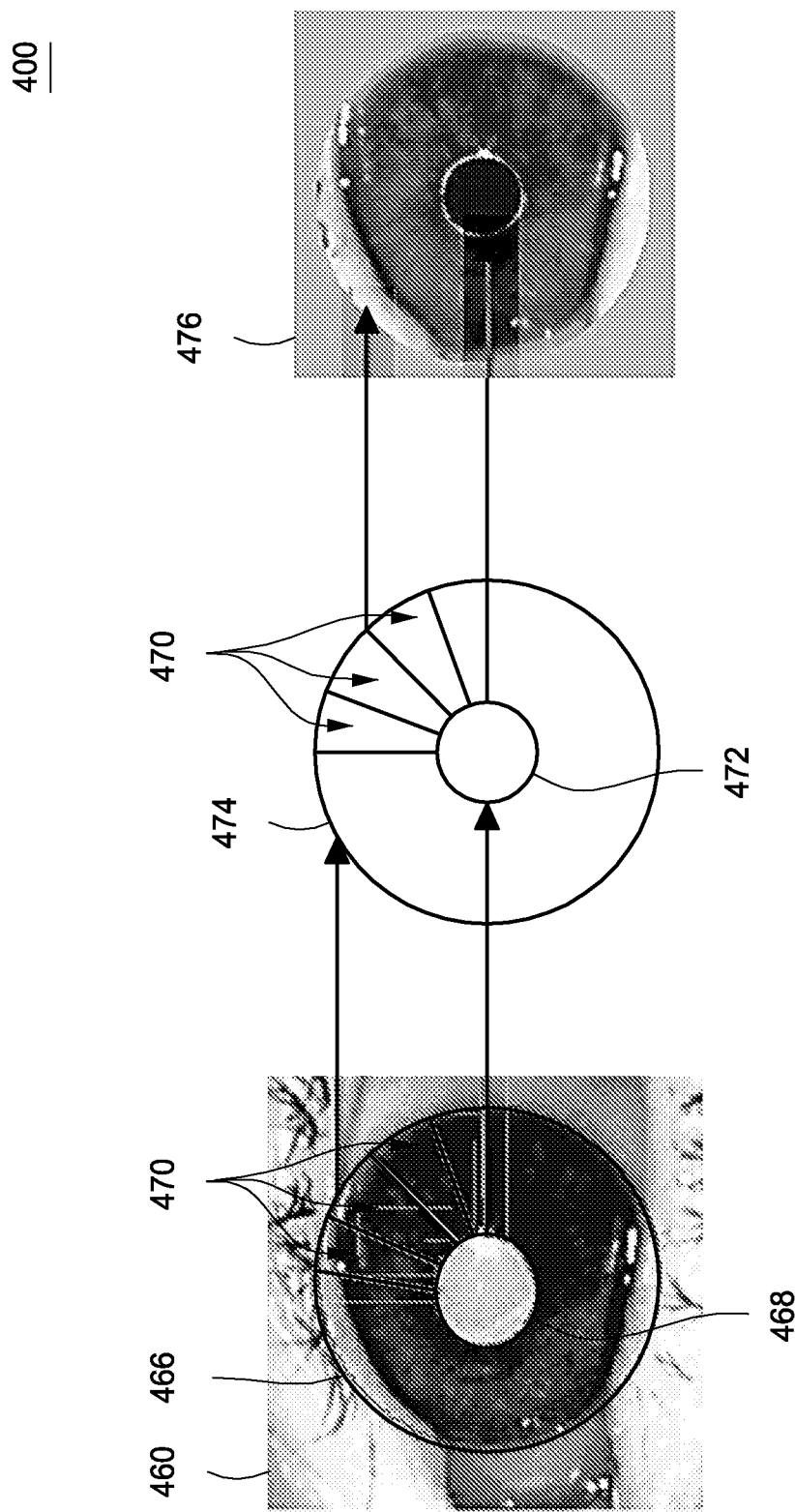
FIG. 4D illustrates the result of correction for foreshortening in accordance with exemplary embodiments of the present invention.

As seen in image 460 in FIG. 4D, after foreshortening correction based on tilt estimation, the pupil still appears shifted to the left with respect to the center of the iris and the pupil appears elongated in the horizontal direction. These effects are caused by the optical effects of the cornea. The corneal correction module 212 corrects for these distortions without modeling the optical elements that produced them by non-linearly warping the iris area/region to force the iris contour 466 and pupil contour 468 to become concentric circles. The corneal correction module 212 creates this non-linear warping function by defining a set of spokes 470 that connect points on the non-circular pupil contour 468 to corresponding points on the non-circular iris/sclera contour 466 and mapping each spoke of the spokes 470 to a position connecting a synthetic circular pupil contour 472 to a concentric circular iris/sclera contour 474. The described transformation is then applied to the underlying image 460. The result of this mapping (with appropriate interpolation) is shown in image 476. After the pupil and iris areas/regions have been shifted to be in concentric circles, the coding process can be more accurately performed with better matching results.

After such a corrected image is constructed as described above, iris coding and matching can be performed using any desired iris biometric algorithm designed to be applied to iris images captured under standard controlled conditions. For example, the classic method of Daugman (Daugman, J., "High confidence visual recognition of persons by a test of statistical independence", *IEEE Transactions on Pattern Analysis and Machine Intelligence,* 15 (11), pp 1148-1161 (1993)) can be applied. However, methods developed by others can also be used, including but not limited to those of Munro (D. M. Monro and D. Zhang, An Effective Human Iris Code with Low Complexity, Proc. IEEE International Conference on Image Processing, vol. 3, pp. 277-280, September 2005) and Tan (Tan et al, Efficient Iris Recognition by Characterizing Key Local Variations IEEE TRANSACTIONS ON IMAGE PROCESSING, VOL. 13, NO. 6, JUNE 2004).

Figure 5:
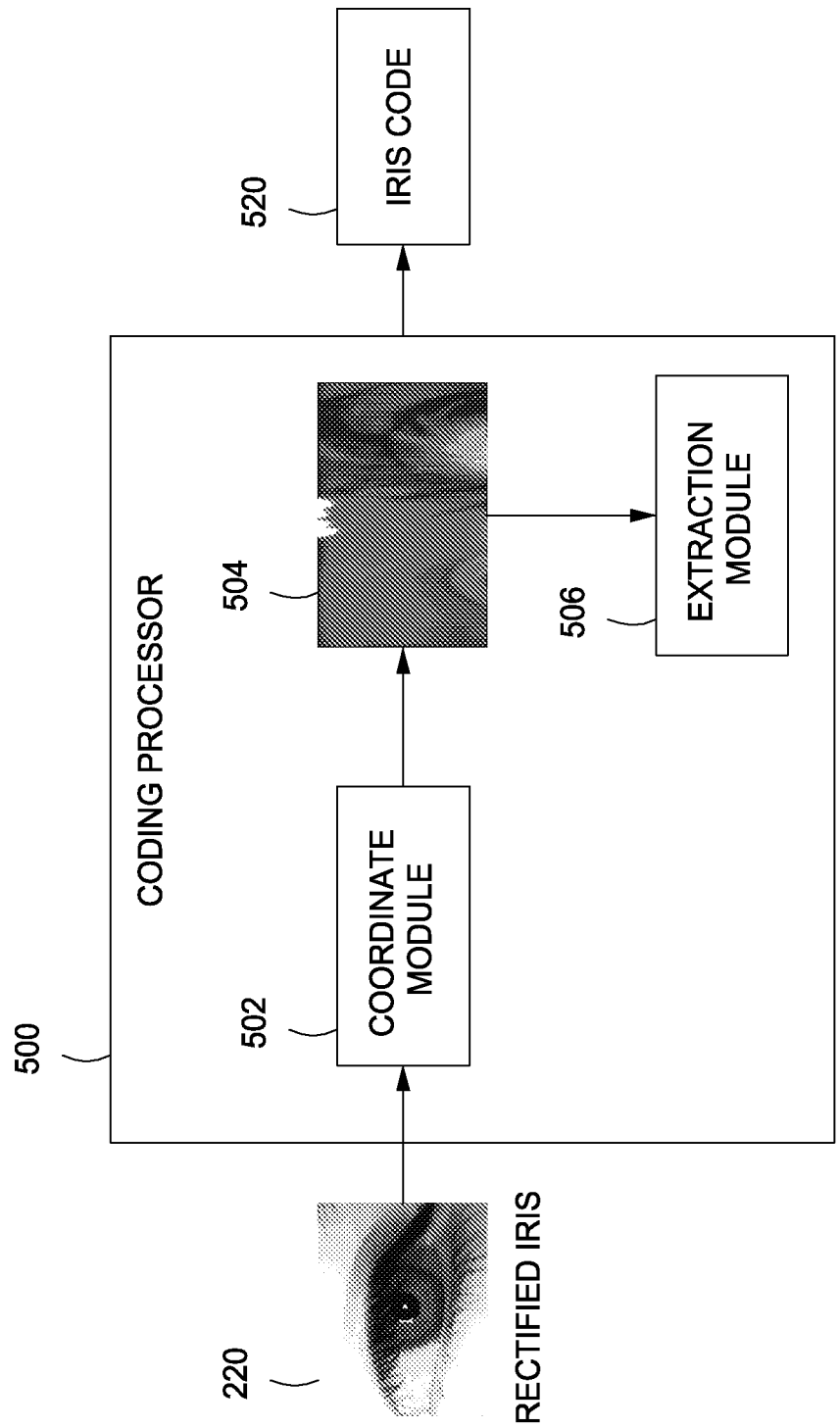
FIG. 5 depicts a block diagram of a coding processor in accordance with exemplary embodiments of the present invention.

FIG. 5 depicts a block diagram of a coding processor 500 in accordance with exemplary embodiments of the present invention. The coding processor 500 comprises a coordinate module 502 and an extraction module 506.

The coordinate module 502 constructs an invariant coordinate system for an invariant coordinate system image representation that allows iris information extracted from varying iris images to be brought into register, so that corresponding spatial information can be compared. The extraction module 506 extracts information from the iris image for supporting a strong rejection of the hypothesis that two eye images presented represent statistically independent patterns. The coding processor 500 prepares the segmented and corrected iris image 220 for accurate matching with other iris images and allows unconstrained iris capture applications. For example, image size and focus may vary with distance, in addition to individual iris structure variations and variation with illumination wavelength of spatial information content of an iris structure. Generally, iris coding is based on angular frequencies between about 15 and 40 cycles/2pi or 2.5 and 6 pixels per cycle, where according to one embodiment, the present application achieves robust matching based on the codes generated by the coding processor 500 down to approximately 40 pixels per iris diameter.

According to one embodiment, the coding processor 500 uses a variant of Daugman's local phase representation, which encompasses a multi-resolution coding approach rather than choosing a single scale of analysis. Lower frequency components remain available in lower resolution images and are less prone to loss in defocused or otherwise degraded images. In one embodiment, the variant of Daugman's local phase representation allows for dense coding that is useful when dealing with iris images in which significant occlusion may occur. Although the robust segmentation and rectification process described above generates corrected iris images that can be used with a variety of iris coding and matching algorithms, there are advantages in some situations to retaining properties of standard algorithms. One advantage of the Daugman type phase coding approach is that it generates a code that represents all available parts of the iris images. This is in contrast to an approach that uses sparse local features that might be occluded or otherwise unavailable in a particular image to be matches. Further, the use of multiresolution phase approach preserves the possibility of achieving code-level compatibility with existing phase-based representations. In addition to containing multi-scale information, the code that is created will incorporate additional information to facilitate estimation of iris code alignment and spatial interpolation of local structure information prior to comparison.

As shown in FIG. 5, the coding processor 500 comprises the coordinate module 502. The coordinate module 502 transforms the rectified iris image 220 into a polar iris image 504. In this polar iris image 504 the pupil boundary appears at the top (notice the specular reflection of a biometric scanner illuminator column) and the iris-sclera boundary area appears at the bottom. The angular dimension runs clockwise from 3 o'clock at the left of the image. Proceeding from left to right, the lower and upper eyelids can be seen. Note that in image 504 the eyelashes extend from the upper eyelid all the way into the pupil.

Figure 6:
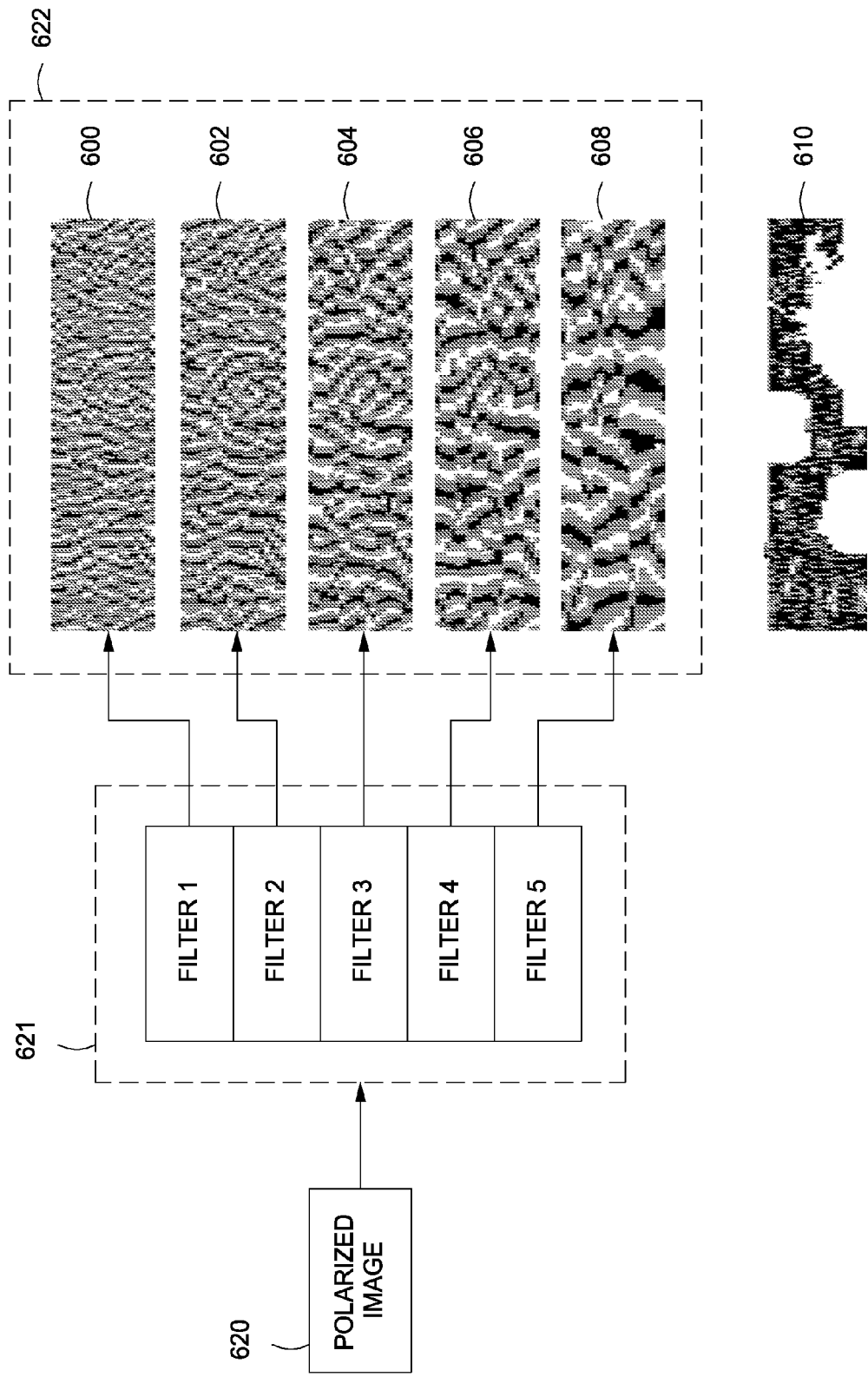
FIG. 6 depicts a sample multiresolution iris code in accordance with exemplary embodiments of the present invention.

Subsequently, after converting the rectified iris image into a polar coordinate image, the image 504 is coupled to the extraction module 506 that filters and subsamples the polar iris image 504 to produce a multi-resolution iris code representation 520, an example of which is shown in FIG. 6. According to an exemplary embodiment, the image 504 is passed through a series of bandpass filters to produce a set of filtered images. FIG. 6 shows an example of a polar iris image 620, being filtered by filters 121 (Filters 1 . . . 5) and producing an iris code 622 comprising filtered bands 600, 602, 604, 606 and 608, respectively high-frequency domain bands to low frequency domain bands. The five bands shown correspond to Gabor filter (a linear filter used for harmonic analysis, wavelet decompositions, and edge detection) carrier wavelengths of 6, 8, 12, 16, and 24 pixels with respect to a polar image sampled at 200 pixels around the iris. Therefore, the frequencies correspond approximately to angular spatial frequencies of 33, 25, 16, 12, and 8 cycles per 2pi.

The higher frequencies are comparable to those used in standard iris matching algorithms. The mask 610 is the union of two masks: a mask (common to all bands) based on analysis of the intensities in the input polar iris image 504 that masks off area corresponding to specular reflections and approximate location of eyelid and eyelash areas, and a mask based on the signal strength in the Gabor filtered image that masks off areas in which local phase measurement is unstable (unstable regions). Multi-resolution representation as shown in iris code 622 allow representation of information from images at different camera-subject distances that result in iris images differing in number of pixels per unit distance at the iris as well as oblique camera views causing foreshortening and optical demagnification, as discussed above with reference to FIGS. 2-4D.

Other important properties of an iris code representation 520 include a complete description of the filter characteristics, spatial sampling, representation and quantization. Filter characteristics comprise one or more of center frequencies, bandwidths, functional type (e.g. log Gabor), and orientation tuning. Spatial sampling comprises one or more of spacing along the radial and angular normalized image axes for each filter type, and quantization specifies the number levels with which each value is represented or number of bits assigned to each. According to exemplary embodiments, the iris code representation 520 and exemplary iris code 622 is a warpable code allowing for interpolation by using sub-Nyquist spatial sampling requirements for each filter 1 . . . 5 in filters 621 that produces provide a criterion for sufficient sampling for accurate interpolation. The sub-Nyquist spatial sampling is combined with a finer intensity quantization than the 1 bit per complex phase component used in Daugman-type coding. For example, if 4 bits are used for each complex phase component this corresponds to roughly 64 steps in phase angle and thus a maximum interpolation error of pi/32 radians or less than six degrees.

In some embodiments, non-quantized iris codes may also be matched, where original complex band-pass filter outputs are stored without quantization. In one embodiment, the filter outputs are normalized in magnitude so that each represents a complex number on the unit circle. Data masks are generated based on occlusions and local complex amplitude. The match measure that is the closest analog of the standard Hamming Distance measure of a Daugman iris code is based on a phase difference histogram. This histogram constructed by computing the angles between the phase vectors of the two codes being compared (see FIG. 6), and compiling a histogram (subject to the valid data mask) of phase differences between $-\pi$ and $\pi$. These phase differences should be small if the codes represent the same eye and more or less uniformly distributed if the codes represent statistically independent eyes.

Figure 7:
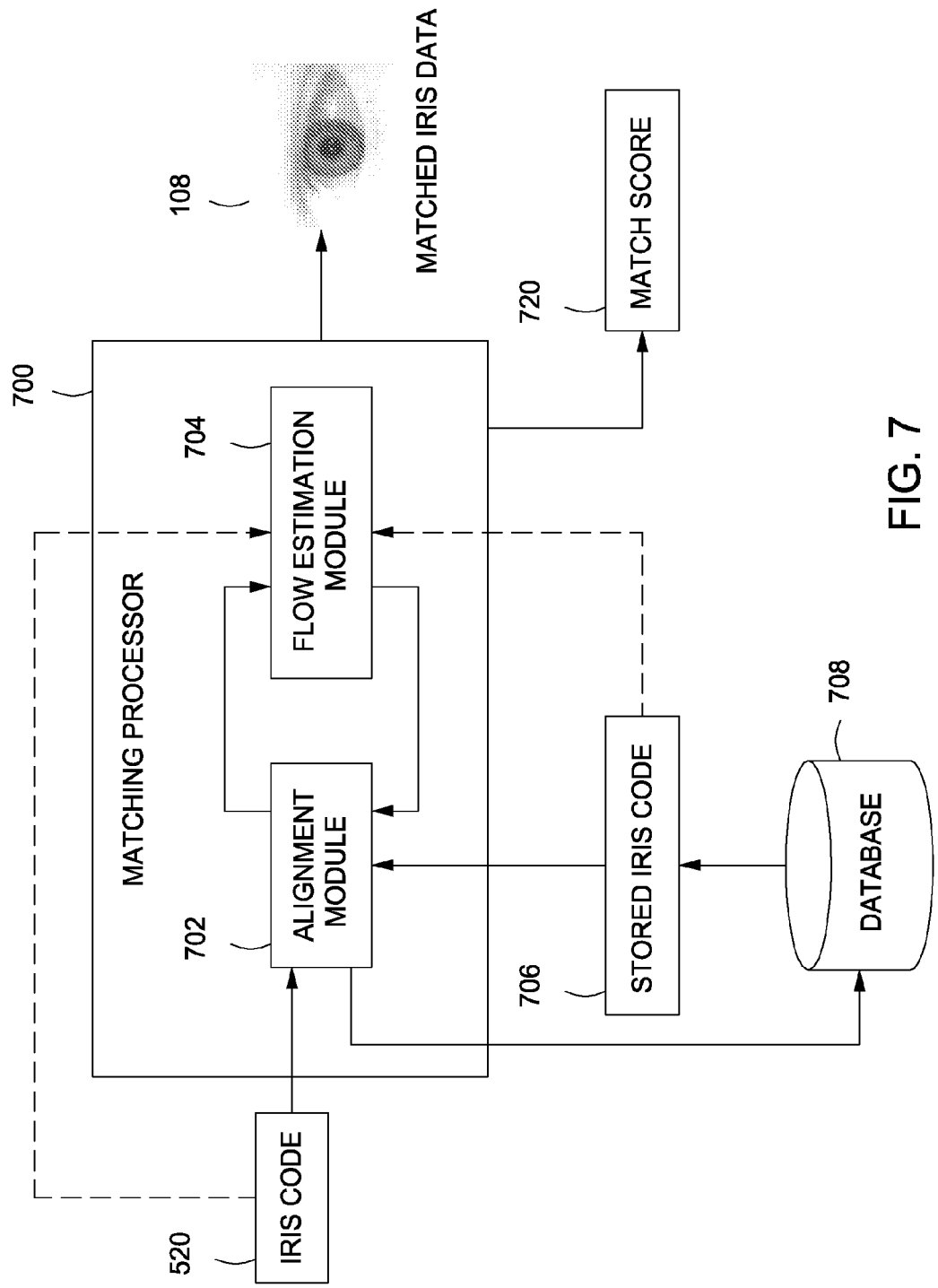
FIG. 7 depicts a block diagram of a matching processor in accordance with exemplary embodiments of the present invention.

An example of two such histograms is shown in FIG. 7. The histogram on the left corresponds to an impostor match and the one on the right to an authentic match. As expected, the authentic distribution is tightly concentrated around a zero phase shift with only a small proportion of the phase difference values larger than pi/2 in absolute value. In contrast, the impostor histogram shows many large phase differences and no clear evidence of concentration around zero value. The fraction of values larger than pi/2 can be used to generate a match statistic that behaves very much like Daugman code Hamming distance if this is desired. However, there are many other measures of central concentration and dispersion that may be used to distinguish between authentic and impostor distributions, as will be described below. Furthermore, give sufficient training sets of impostor and authentic histograms it may be beneficial to use statistical classification or machine learning techniques such as discriminant analysis, Support Vector Machines, Neural Networks, or Logistic Regression to construct an optimal decision procedure for some class of data.

Measurements of the central value of a phase difference histogram, and of the dispersion around that point takes into account the fact that the phase differences are angles and therefore the histogram is distributed on a closed circle. Ordinary mean and variance measures (or higher moments if necessary) do not correctly represent the desired properties for angular data. The Von Mises distribution provides a well characterized method for estimating properties of data distributed over a periodic domain. The Von Mises mean gives an estimate of the center of concentration of the distribution and the concentration parameter and estimate of the spread. Both quantities can be computed easily if the phase differences are represented as unit complex numbers. In this case, the mean estimate is simply the angle corresponding to the sample mean of the complex numbers, and the concentration parameter is simply related to the complex magnitude of the sample mean.

According to another embodiment, data is analyzed over a periodic domain by employing a Fourier series expansion to compute circular harmonics. Like the Von Mises parameters, the relative magnitude low order circular harmonics give information about degree of concentration of the data. Transformation of the histogram data using circular harmonics is beneficial prior to use of learning techniques to construct a decision procedure.

The phase difference histogram aids in analysis of the match level between two codes but does not represent all of the information relevant to the comparison of two codes. If the phase difference value varies as a function of the absolute phase then the histogram shows low concentration (i.e. large dispersion) even given a strong relationship. According to one embodiment, a Mutual Information or other conditional entropy description is employed to prevent this problem, which measures the reduction in the entropy of one random variable given knowledge of the value of another random variable. This more complete characterization will detect relatedness even where the variables are uncorrelated.

Another limitation of the phase difference histogram is that it completely suppresses spatial information since the histogram is a global statistic. However, local or patchwise uniformity of phase differences or other detectable relatedness would also be sufficient to conclude that the codes are not independent. This local analysis could be achieved using local histogram analysis, mutual information, or spatial correlation analyses.

FIG. 7 depicts a block diagram of a matching processor 700 in accordance with exemplary embodiments of the present invention. The matching processor 106 comprises an alignment module 702 and a flow estimation module 704. According to exemplary embodiments, the iris code 520 generated by the coding processor 500 as shown in FIG. 5 is coupled to the alignment module 702. The alignment module 702 performs various alignments to the iris code 520 based on matching algorithms described below. The alignment module 702 further couples the iris code 520 to the flow estimation module 704 to generate estimated flow vectors to aid in matching. The alignment module 702 compares the iris code 520 to an iris code 706 from database 708 to determine whether a match exists. If a match does not exist, more iris codes from the database 708 are compared with the iris code 520. Match scores are determined, and if the match score meets or is below a predetermined threshold, then a match exists. According to exemplary embodiments, a Hamming distance is used as a match score. Ultimately the matched iris data 108 is returned by the matching processor 700. According to some other embodiments, flow estimation is applied to information derived from the unknown iris code 520 and the stored iris code 706. This information may be part of the iris code 520 per se or it may not. The resulting flow field from the flow estimation module 704 is used to generate a modified iris code that is matched against a reference iris code by the matching processor 700 to produce a match score 720.

In a binary context, i.e., comparing iris codes, a Hamming distance represents a binary distance based on XOR operations to computes the number of bits that differ between two binary images. According to exemplary embodiments, the alignment module 702 performs a Daugman barrel shift on the iris codes, i.e., finds the iris code rotation that provides the best match between the iris codes being compared. In one embodiment, the matching algorithm employed by the matching processor 700 is a modified algorithm using the Hamming distance (HD) for each set of barrel shift positions and taking the lowest Hamming distance as the score for that pair of codes. If the score is below some threshold (that may be adjusted based on the estimated number of statistical degrees of freedom represented by the codes) then the unknown code is deemed to be a match. If the HD is above the threshold then the unknown code is labeled an impostor. In one embodiment, the threshold depends on details of the iris code structure and on the statistical requirements of the matching scenario.

The modified algorithm employed by the alignment module 702 barrel shifts the iris codes being compared and also locally aligns the iris codes to each other to compensate for inaccuracies in iris image normalization due to uncorrected optical distortion or complexities of iris dilation and contraction. The local alignment function, performed by alignment module 702, allows compensation for distortions in the input iris image that are not uniform across the iris. This is accomplished by shifting local regions of the code to bring them into more accurate alignment with corresponding regions of the reference code. If this process is performed using very small estimation regions, virtually any iris code can be made to match any other iris code which will result in false matches being generated.

This false matching problem can be avoided to imposing suitable smoothness conditions on the estimated flow field. For example, if the flow field is estimated by performing local translation estimation using relatively large estimation regions then the local flow estimates will represent the average motion over this relatively large region.

If such region overlap, so that the regions used to compute the flow vectors for neighboring locations contain much of the same content, then the displacement estimates will change gradually with position and false matching will be prevented. Alternatively, local displacement estimates made with small estimation regions can be smoothed by spatial filtering to eliminate rapid changes in local displacement. As a further alternative, a global parametric representation such as a low order polynomial or truncated Fourier series can be used, and the parameters of this parametric representation estimated directly or fit to local estimates. Such parametric representation has inherent smoothness properties that prevent too rapid change in local shifts to occur. The alignment module 702 further produces multiple match scores for each comparison, between iris code 520 and 706 for example, because each iris code contains multiple frequency bands.

Figure 8:
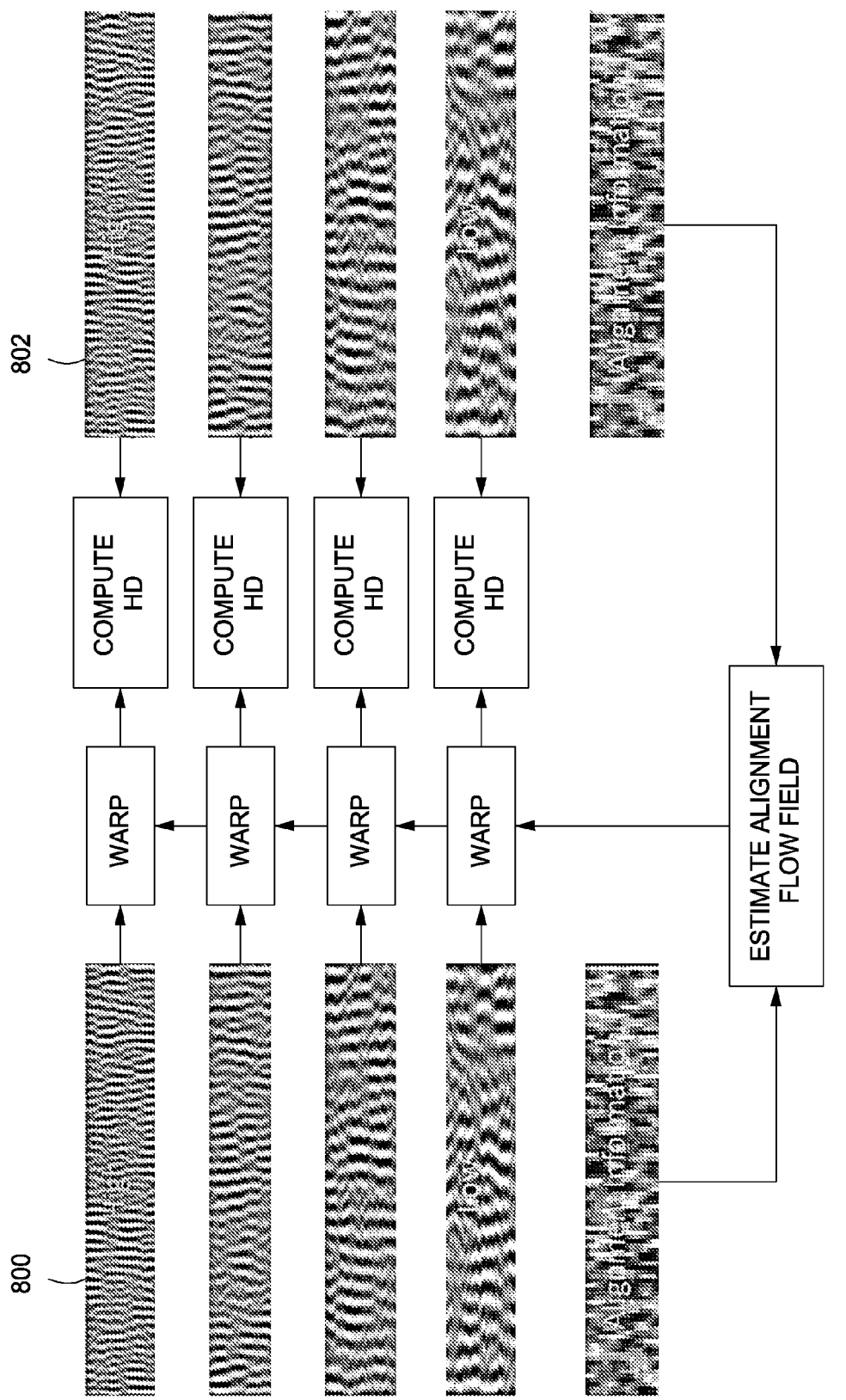
FIG. 8 depicts the process of matching iris codes performed by the matching processor in accordance with exemplary embodiments of the present invention.

FIG. 8 depicts the process of matching iris codes performed by the matching processor 700 in accordance with exemplary embodiments of the present invention. As in standard iris code matching, the first code 800 and the second code 802 to be matched are represented as values over the rectified (e.g., polarized) iris image coordinate system consisting of an angular and a normalized radial coordinate. A local displacement function or flow field is computed by the flow estimation module 704 of the matching apparatus in FIG. 7 and coupled to the alignment module 702 that best aligns structure in the first iris code 800 to corresponding structure in the second code 802, subject to some smoothness or parametric constraint. This flow field estimation can include the effect of standard barrel shift alignment or that can be performed as a separate step. The vectors in this flow field each specify the displacement in the normalized image coordinate system at which the image structure in the first code 800 best matches the structure in the second code 802.

Each band in first iris code 800 is transformed using this displacement function to produce an aligned iris code, and the Hamming distance between this aligned iris code and the corresponding band of the second code 802 is computed. Because the transformation is constrained to be smooth, impostor codes will not be transformed into authentic codes as will be described below.

The flow estimation module 704 computes a flow field at a reduced resolution for each iris code, and smoothly interpolates the flow field to produce a final estimate. According to an exemplary embodiment, the flow estimation module 704 employs a pyramid-based coarse-fine flow estimation technique, though those of ordinary skill would recognize that other techniques may be used instead. The alignment module 702 introduces a small local shift in one band of each of the first iris code 800 and the second iris code 802, the shift being in the angular direction and equal at all radial positions. The displacement shift also varies smoothly in the angular direction. Calculating a Hamming Distance at this point would result in a non-match (e.g., if a Daugman-type matching algorithm is employed a hamming distance greater than 0.33 indicates a non-match). A coarse-fine algorithm is used by the flow estimate module 704 to estimate the flow field between codes 800 and 802 from the low resolution bands of the codes.

The alignment module 702 then warps the code 800 by the estimated flow field resulting in a significantly decreased Hamming Distance, signaling a high confidence match. For a Daugman-type matcher, a hamming distance<0.3 indicates a high confidence match. Those of ordinary skill in the art will recognize that various matches may corresponding with different hamming distance values qualifying as high confidence matches. According to another embodiment, the matching processor 700 may match two iris codes by employing a mutual information measure based on the phase angles of the codes being compared as well as measures based on the local difference of phase angles.

Figure 9:
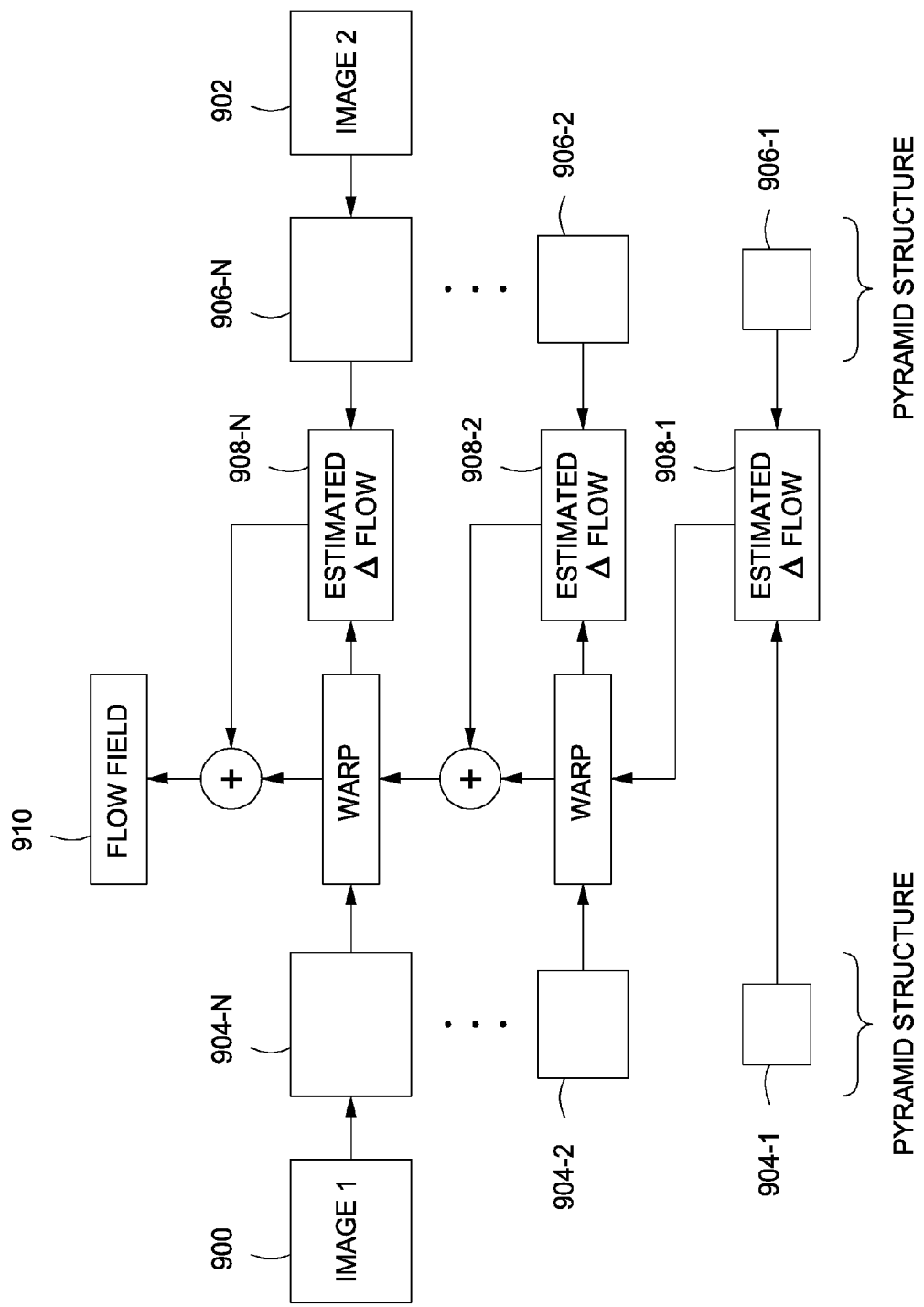
FIG. 9 is a depiction of the coarse-fine algorithm described above to estimate flow-field of an iris code in accordance with exemplary embodiments of the present invention.

FIG. 9 is a depiction of the coarse-fine algorithm described above to estimate flow-field of an iris code in accordance with exemplary embodiments of the present invention. Coarse-fine refinement operates on a "pyramid" structure that is essentially a collection of bandpass filtered version 904-1 to 904-N and 906-1 to 906-1 of the input images 900 and 902 respectively, as shown in FIG. 9.

Starting with the lowest frequency bands 904-1 and 906-1, at each level in the pyramid the displacements 908-1 to 908-N estimated at the previous level are used to warp the current level image and then an incremental displacement is computed based on the residual difference between the warped level and the corresponding pyramid level in the other image. This process continues until the highest level is reached and the result is the final estimated flow field 910.

Since the multi-resolution iris code is itself a collection of bandpass filtered versions of the images with which alignment is desired, according to one embodiment, these bands themselves could be used to drive the alignment process in the alignment module 702. This would produce a truly "self aligning" iris code. In this approach there is no need to store additional alignment data as part of the multi-resolution iris code structure.

Figure 10:
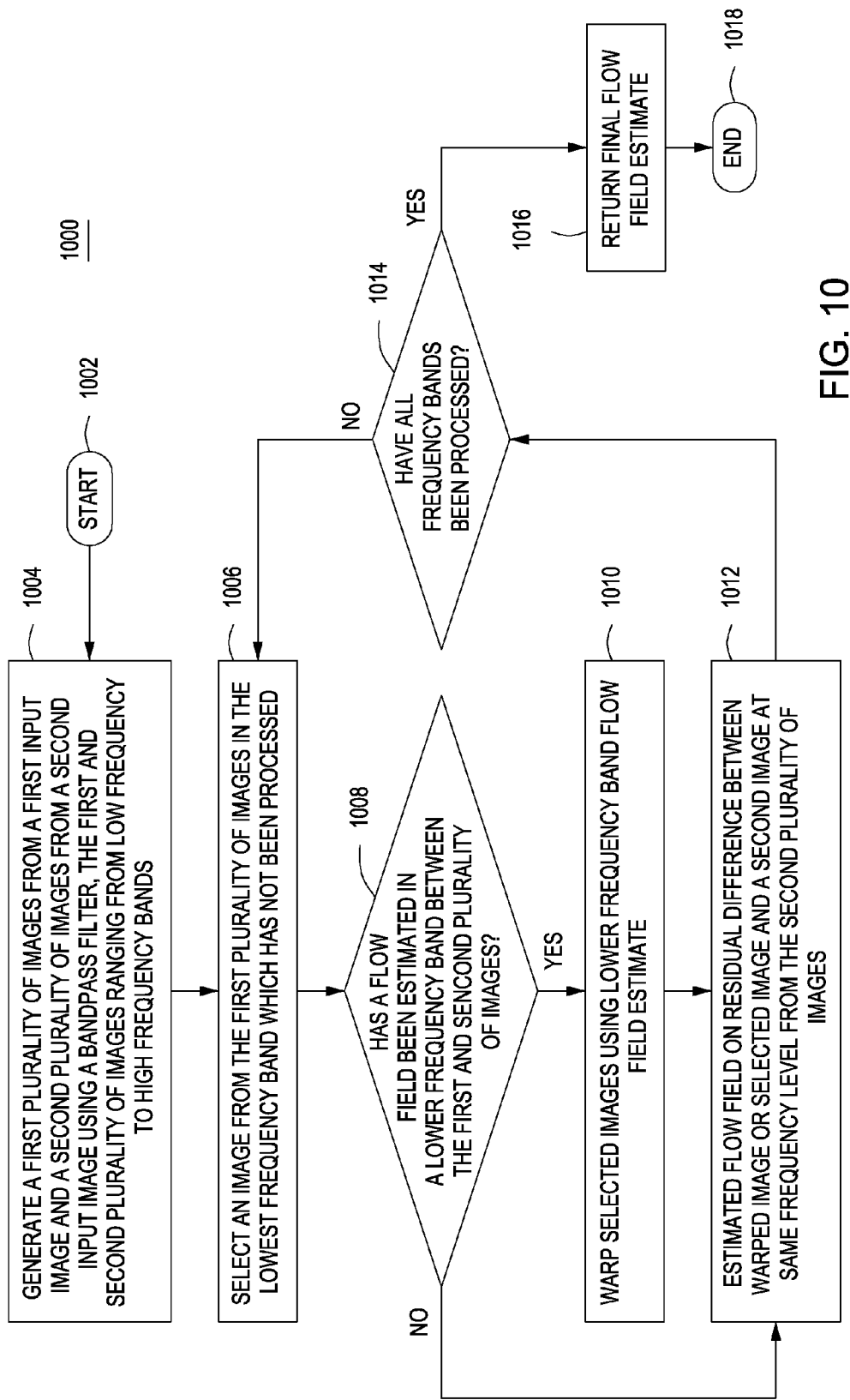
FIG. 10 is a flow diagram depicting method for estimating flow field between two iris codes in accordance with exemplary embodiments of the present invention.

FIG. 10 is a flow diagram depicting method 1000 for estimating flow field between two iris codes in accordance with exemplary embodiments of the present invention. The method is an implementation of the flow estimation module 704. The method begins at step 1002 and proceeds to step 1004.

At step 1004, the flow estimation module 704 generates a first plurality of images from a first input image (i.e., a first iris code) and a second plurality of images from a second input image (i.e., a second iris code to be matched against) using a bandpass filter, the first and second plurality of images comprising images ranging from low frequency to high frequency bands.

The method subsequently proceeds to step 1006, where the flow estimation module 704 selects an image from the first plurality of images in the lowest frequency band that has not been processed, i.e., for which there is no previous flow-field estimate. At step 1008, the flow estimation module 704 determines whether a flow field has been estimated in a lower frequency band between the first and second plurality of images. If a flow field has been estimated in a lower frequency band, the method proceeds to step 1010, where the selected image is warped using the lower frequency band flow field estimate. If a flow field estimate in a lower frequency band has not been estimated, then the method proceeds to step 1012, where a flow field is estimated by the flow estimation module 704 on the residual difference between the warped image and a second image at the same frequency band from the second plurality of images.

The method then proceeds to step 1014, where the flow estimation module 704 determines whether all frequency bands have been processed. If not, then the method returns to step 1006 to process the next higher frequency band until all frequency bands have been processed. When all frequency bands have been processed (i.e., warped by lower frequency flow field estimates), the method proceeds to step 1016, where the final flow field estimate is returned to the matching processor 700. The method terminates at step 1018.

Figure 11:
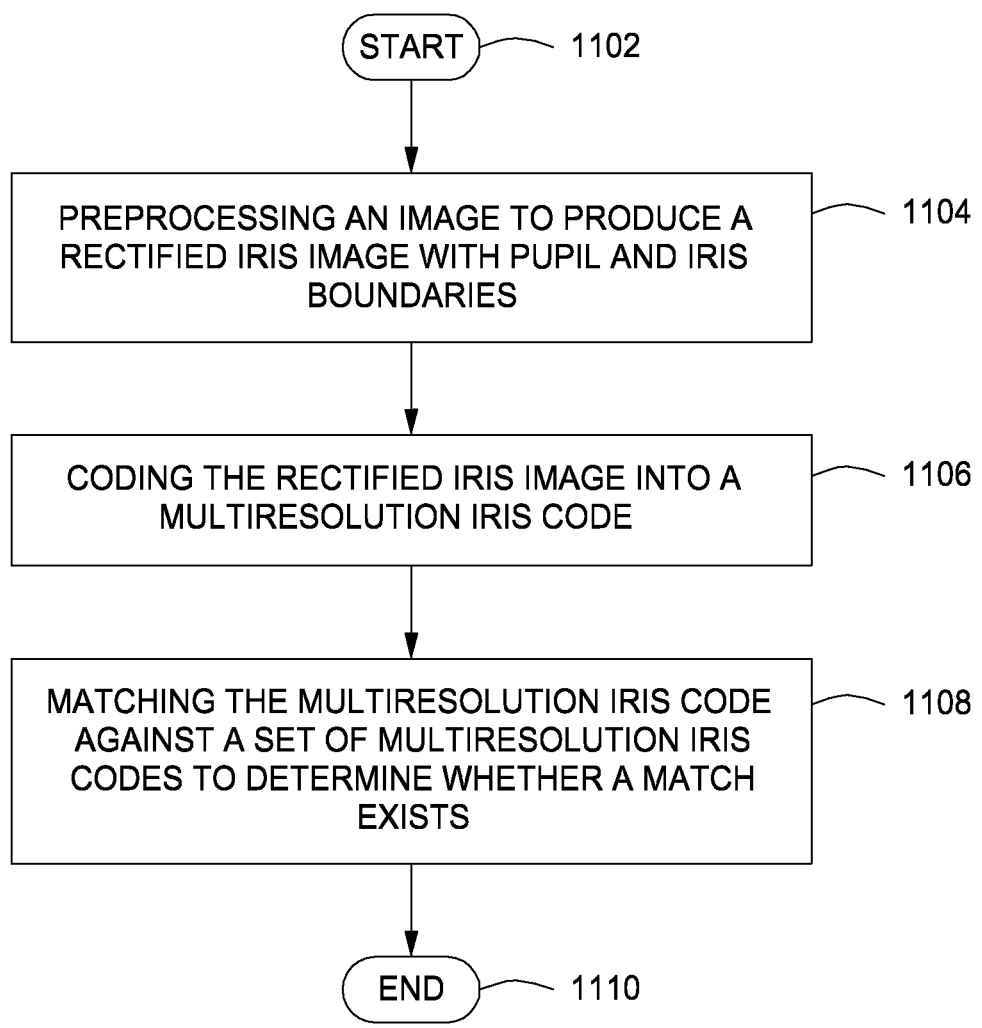
FIG. 11 is a flow diagram depicting method for estimating flow field between two iris codes in accordance with exemplary embodiments of the present invention.

FIG. 11 is a flow diagram depicting method 1100 for estimating flow field between two iris codes in accordance with exemplary embodiments of the present invention. The method is an implementation of the iris processor 100. The method begins at step 1102 and proceeds to step 1104.

At step 1104, the pre-processor 102 pre-processes and input image containing an eye to produce a rectified iris image with rectified pupil and iris boundaries, and correction for tilt and corneal distortion.

The method proceeds to step 1106, where the coding processor 104 codes the rectified iris image into a multiresolution iris code. The iris code contains multiple frequency band representations of a polarized version of the rectified iris image. The method then proceeds to step 1108, where the multiresolution iris code is compared to a set of stored iris codes in a database to determine whether the iris code is contained in the database and returns data associated with the matched iris. The method terminates at step 1110.

Figure 12:
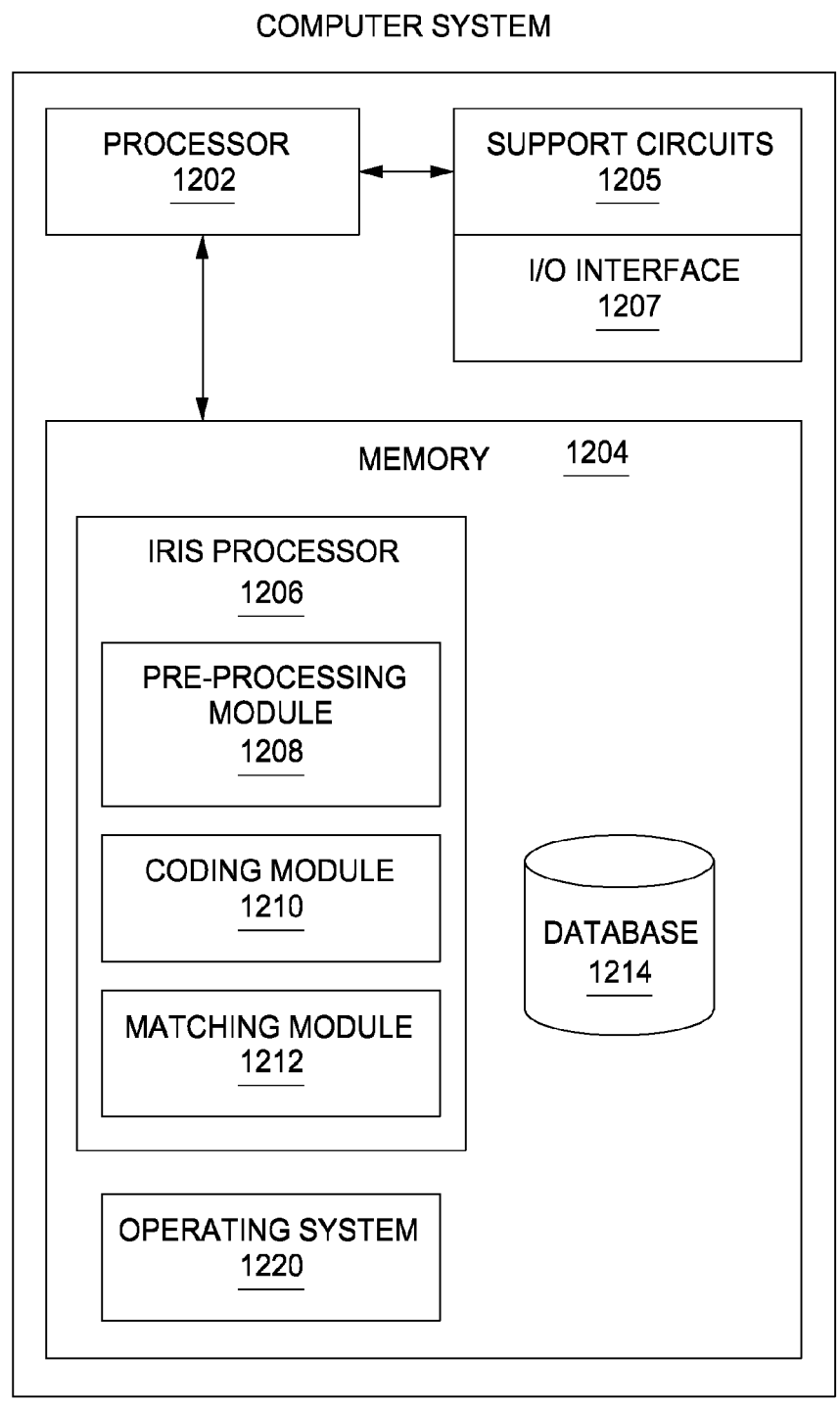
FIG. 12 depicts a computer system for implementing the iris processor in accordance with exemplary embodiments of the present invention.

FIG. 12 depicts a computer system for implementing the iris processor 100 in accordance with exemplary embodiments of the present invention. The computer system 1200 includes a processor 1202, various support circuits 1205, and memory 1204. The computer system 1200 may include one or more microprocessors known in the art similar to processor 1202. The support circuits 1205 for the processor 1202 include conventional cache, power supplies, clock circuits, data registers, I/O interface 1207, and the like. The I/O interface 1207 may be directly coupled to the memory 1204 or coupled through the support circuits 1205. The I/O interface 1207 may also be configured for communication with input devices and/or output devices such as network devices, various storage devices, mouse, keyboard, display, video and audio sensors, visible and infrared cameras and the like.

The memory 1204, or computer readable medium, stores non-transient processor-executable instructions and/or data that may be executed by and/or used by the processor 1202. These processor-executable instructions may comprise firmware, software, and the like, or some combination thereof. Modules having processor-executable instructions that are stored in the memory 1204 comprise an iris processor 1206. The iris processor 1206 further comprises a pre-processing module 1208, a coding module 1210 and a matching module 1212. The memory 1204 may further comprise a database 1214, though those of ordinary skill in the art will recognize that the database 1214 need not be in the same physical memory 1204 as the iris processor 1206. The database 1214 may be remotely accessed by the iris processor 1206 via a cloud service. Additionally, those of ordinary skill in the art will recognize that the iris processor 1206 may also have several components that may not be co-located on memory 1204. For example, in some embodiments, the pre-processing module 1208 is local to the computer system 1200, while the coding module 1210 and the matching module 1212 may be accessed as cloud services via a wired or wireless network. In other instances, only the matching module 1212 is accessed via a network. Communication between each module may be encrypted as the data travels over the network.

The computer system 1200 may be programmed with one or more operating systems 1220 (generally referred to as operating system (OS)), that may include OS/2, Java Virtual Machine, Linux, SOLARIS, UNIX, HPUX, AIX, WINDOWS, WINDOWS95, WINDOWS98, WINDOWS NT, AND WINDOWS2000, WINDOWS ME, WINDOWS XP, WINDOWS SERVER, WINDOWS 8, Mac OS X, IOS, ANDROID among other known platforms. At least a portion of the operating system may be disposed in the memory 1204.

The memory 1204 may include one or more of the following random access memory, read only memory, magneto-resistive read/write memory, optical read/write memory, cache memory, magnetic read/write memory, and the like, as well as signal-bearing media as described below.

Those of ordinary skill in the art will recognize that the computer system 1200 may be a mobile device such as a cellular phone or tablet device, for example. The mobile device may contain a camera and have the iris processor 1206 stored on memory as an application. In some embodiments, the iris processor 1206 may be a part of the operating system 1220. In some instances, the iris processor 1206 may be an independent processor, or stored on a different chip than the processor 1202. For example, often mobile devices have camera processing modules and the iris processor 1206, or portions of the iris processor 1206, may reside on the camera processing module, where the imager in the camera is a CCD or CMOS imager. In some instances, the mobile device may be customized to include some sensors, the type of the camera imager, or the like.

Figure 13:
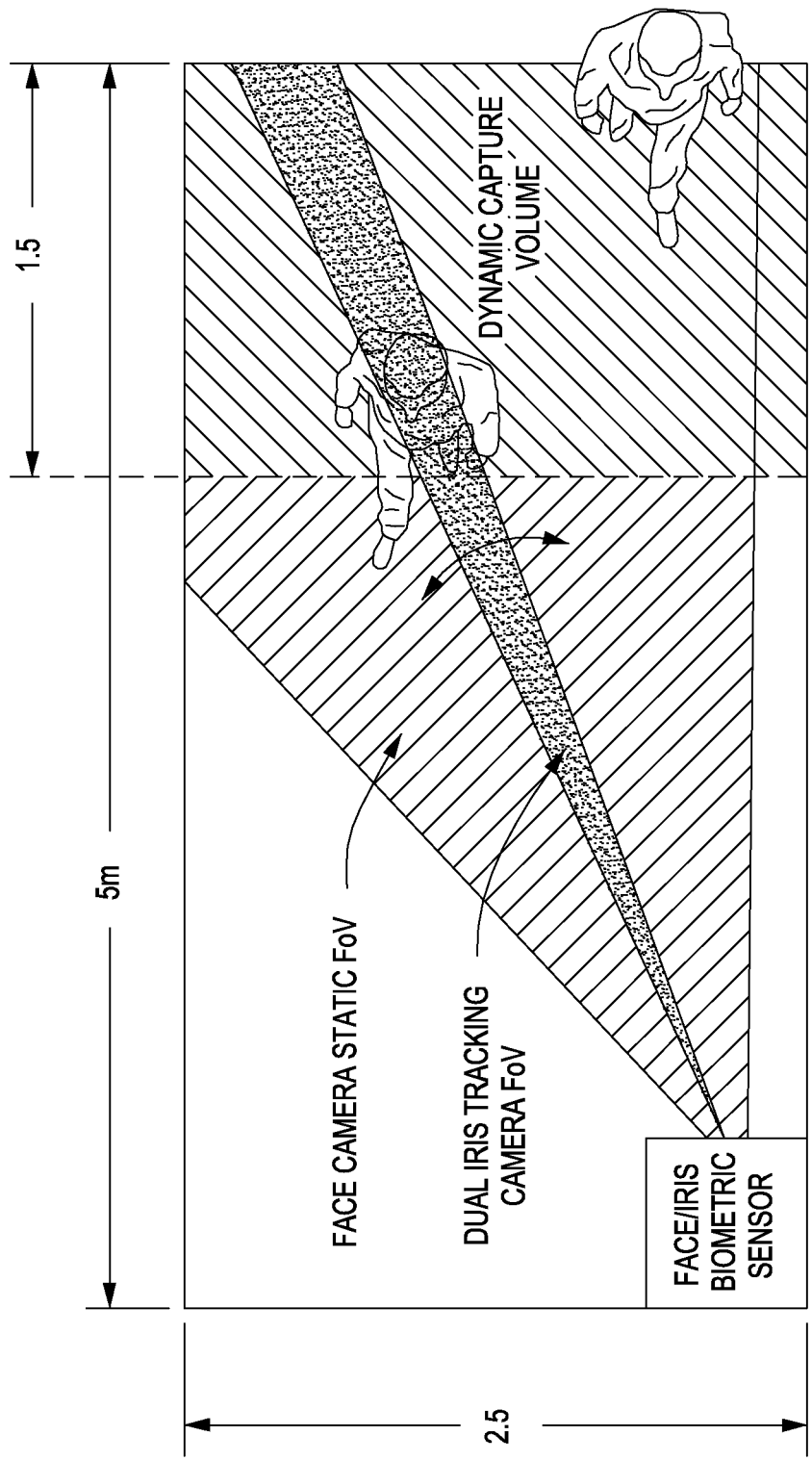
FIG. 13 illustrates the iris processor in an exemplary operating scenario in accordance with exemplary embodiments of the present invention.

FIG. 13 illustrates the iris processor 100 in an exemplary operating scenario. In this case a combination of face tracking and a steerable/autofocus iris capture device comprising the iris processor 100 is used to identify multiple individuals walking down a corridor. The capture device may be placed unobtrusively at the side of the corridor, and can operate at a large range of capture distances yielding a range of presentation angles, if a device with the capabilities of the current invention is used. Mechanisms to track individuals in an environment and direct one or more cameras to capture image data have been disclosed in U.S. Pat. No. 6,437,819. However, the iris images captured in this way will not meet the processing requirements of existing iris biometric systems due to oblique viewing, low resolution and other factors. According to this invention, by combining identity information derived from iris biometrics with tracking information from the person tracking system it is possible to associate an identity (or failure to identify an identity) with each person passing through the active capture region.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A method for biometric iris matching comprising:
   pre-processing an input image capturing one or more eyes;
   constructing a corrected version of the input image, the corrected version of the input image comprising a synthesized frontal presentation of at least a portion of an eye captured in the input image;
   coding the one or more rectified iris images into one or more multiresolution iris codes; and
   matching the one or more multiresolution iris code with a set of stored multiresolution iris codes to determine whether a match exists.

2. The method of claim 1 wherein the pre-processing further comprises:
   segmenting a pupil area in each of the one or more eyes in the input image;
   segmenting an iris area from a sclera area in each of the one or more eyes in the input image; and
   synthesizing an artificial pupil on the input image within the segmented pupil area.

3. The method of claim 2 wherein segmenting the pupil and segmenting an iris/sclera boundary comprises:
   generating one or more edge maps corresponding to each eye in the input image;
   constructing one or more candidate pupil contours based on the one or more edge map, wherein each edge map contains at least one candidate pupil contour; and
   determining a best matching candidate pupil contour for each eye in the input image.

4. The method of claim 2, wherein coding the one or more rectified irises further comprises:
   transforming the rectified iris images into a transformed iris images, wherein the transformed iris images are invariant coordinate system image representations of the rectified iris images;
   masking off specular reflections and unstable regions in the transformed iris images to produce masked converted iris images; and
   subsampling the masked transformed iris images using a bandpass filter into a plurality of filtered images, wherein the plurality of filtered images range from high frequency bands to low frequency bands and the plurality of band images comprise an iris code.

5. The method of claim 1 wherein pre-processing further comprises:
   estimating an angle of tilt of the eye in the input image with respect to a camera that captured the image;
   correcting for perspective distortion based on the estimated angle of tilt; and
   correcting corneal distortion based on the estimated angle of tilt by aligning an iris contour and a pupil contour of the eye into concentric circles.

6. The method of claim 5 wherein correcting for perspective distortion comprises one of: stretching the input image in a direction of the estimated angle of tilt by applying an affine or projective transformation to the input image.

7. The method of claim 5 wherein correcting corneal distortion comprises:
   defining a plurality of spokes connecting a plurality of points on the iris contour to a plurality of points on the pupil contour;
   mapping the plurality of spokes to a position connecting the plurality of points on the iris contour to a synthetic circular pupil contour; and applying the mapping to the input image.

8. The method of claim 1, wherein coding the one or more rectified irises further comprises:
   transforming the rectified iris images into transformed iris images, wherein the transformed iris images are invariant coordinate system image representations of the rectified iris images;
   masking off specular reflections and unstable regions in the transformed iris images to produce masked converted iris images; and
   subsampling the masked transformed iris images using a bandpass filter into a plurality of filtered images, wherein the plurality of filtered images range from high frequency bands to low frequency bands and the plurality of bands comprise an iris code.

9. The method of claim 8 further comprising:
   subsampling the masked transformed iris images to produce five frequency band images, wherein the bands comprise image information with approximate angular spatial frequencies of 33, 25, 16, 12 and 8 cycles per two times pi radians.

10. The method of claim 1, wherein matching the one or more iris codes further comprising:
    aligning a coded iris code and a stored iris code with each other to ease matching;
    determining a Hamming Distance between the coded iris code and the stored iris code; and
    determining that a match exists when the Hamming Distance is less than a predetermined threshold value.

11. The method of claim 10 wherein aligning further comprises:
    computing a local displacement function between the coded iris code and the stored iris code using barrel shift alignment.

12. The method of claim 10 wherein aligning further comprises:
    computing a flow field estimation between the coded iris code and the stored iris code, where vectors in the flow field each specify displacement in a normalized image coordinate system.

13. The method of claim 12, further comprising:
    computing the flow field for each band within the coded iris code and the stored iris code.

14. The method of claim 12, wherein computing the flow field further comprises:
    generating a first plurality of images from a multiresolution code corresponding to the input image and generating a second plurality of images from a multiresolution code corresponding to a stored image using a bandpass filter, the first and second plurality of images ranging from low frequency to high frequency bands;

selecting an image from the first plurality of images in a lowest frequency band that has not been processed;

determining whether a flow field has been estimated in a lower frequency band between the first and second plurality of images;

warping the selected image if a lower frequency band flow field is estimated using a flow field estimate of the lower frequency band;

estimating a flow field on residual difference between the warped image or selected image and a second image at a same frequency level from the second plurality of images; and repeating the above steps until all frequency bands in the first plurality of images have been processed and a final flow field is estimated.

15. The method of claim 14 further comprising:
using the frequency band images in the coded iris code as the first plurality of images, and the frequency band images in the stored iris code as the second plurality of images.

16. The method of claim 10 further comprising wherein the predetermined threshold value corresponds to details of a structure of the iris codes and on statistical requirements of a matching scenario.

17. The method of claim 10 further comprising:
determining a Hamming Distance for each band between the coded iris code and the stored iris code; and
determining a matching score for each band and determining whether a match exists based on a combination of matching scores for each band.

18. A method for biometric iris matching comprising:
pre-processing an input image capturing one or more eyes to produce one or more rectified iris images;
coding the one or more rectified iris images into one or more multiresolution iris codes; and
matching the one or more multiresolution iris code with a set of stored multiresolution iris codes to determine whether a match exists;
wherein the pre-processing comprises:
segmenting a pupil area in each of the one or more eyes in the input image;
segmenting an iris area from a sclera area in each of the one or more eyes in the input image;
inserting an artificial pupil within the segmented pupil area; and
wherein segmenting the pupil and segmenting an iris/sclera boundary comprises:
generating one or more edge maps corresponding to each eye in the input image;
constructing one or more candidate pupil contours based on the one or more edge map, wherein each edge map contains at least one candidate pupil contour; and
determining a best matching candidate pupil contour for each eye in the input image;
wherein constructing one or more candidate pupil contours comprises:
constructing a first candidate pupil contour from a best fitting circle for each of the one or more edge maps;
constructing a second candidate pupil contour from a best inscribed circle for each of the one or more edge maps; and
determining the best matching candidate pupil contour between the first candidate pupil contour and the second candidate pupil contour.

19. The method of claim 18 further comprising:
determining the best match by assessing a level of support for the best fitting circle and selecting the best fitting circle as the best match if this level of support is above a threshold value, and selecting the best inscribed circle as the best match if the level of support for the best fitting circle is below a threshold value.

20. An apparatus for biometric iris matching comprising:
a pre-processor that pre-processes an input image capturing one or more eyes to produce one or more rectified iris images by constructing a corrected version of the input image, the corrected version of the input image comprising a synthesized frontal presentation of at least a portion of an eye captured in the input image;
a coding processor that codes the one or more rectified iris images into one or more multiresolution iris codes; and
a matching processor that matches the one or more multiresolution iris code with a set of stored multiresolution iris codes to determine whether a match exists.

21. A method for distinguishing a pupil, the method comprising, by a computer system:
segmenting a pupil area in one or more eyes detected in an input image; and
segmenting an iris area from a sclera area in each of the one or more eyes in the input image;
wherein segmenting the pupil and iris/sclera boundary comprises:
generating one or more edge maps corresponding to each eye in the input image;
constructing one or more candidate pupil contours based on the one or more edge map, wherein each edge map contains at least one candidate pupil contour; and
determining a best matching candidate pupil contour for each eye in the input image; and
wherein constructing one or more candidate pupil contours comprises:
constructing a first candidate pupil contour from a best fitting circle for each of the one or more edge maps;
constructing a second candidate pupil contour from a best inscribed circle for each of the one or more edge maps; and
determining the best matching candidate pupil contour between the first candidate pupil contour and the second candidate pupil contour.

22. A method for estimating tilt of an eye in an input image, the method comprising, by a computer system:
receiving an orientation of a camera capturing one or more frames of an eye; and
estimating a direction of a tilt of the eye with respect to the camera orientation;
wherein correcting for perspective distortion comprises one of: stretching the input image in the estimated direction of tilt and applying an affine or projective transformation to the input image; and
wherein correcting corneal distortion comprises:
defining a plurality of spokes connecting a plurality of points on an iris contour to a plurality of points on a pupil contour of the eye;
mapping the plurality of spokes to a position connecting the plurality of points on the iris contour to a synthetic circular pupil contour; and
applying the mapping to the input image.

* * * * *